(12) United States Patent
Bakhsh et al.

(10) Patent No.: US 7,000,944 B2
(45) Date of Patent: Feb. 21, 2006

(54) INFLATABLE WINDSHIELD CURTAIN

(75) Inventors: Ali Emam Bakhsh, Rochester Hills, MI (US); Al A. Saberan, New Baltimore, MI (US); Rico Scott Bertossi, Richmond, MI (US); Ayad E. Nayef, Sterling Hts., MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/301,966

(22) Filed: Nov. 22, 2002

(65) Prior Publication Data

US 2004/0100073 A1    May 27, 2004

(51) Int. Cl.
*B60R 21/22* (2006.01)

(52) U.S. Cl. ............................. 280/730.1; 280/743.1

(58) Field of Classification Search ........... 280/730.1, 280/730.2, 743.1; B60R 21/06, 21/08
See application file for complete search history.

(56) References Cited

U.S. PATENT DOCUMENTS

| | | | |
|---|---|---|---|
| 2,755,125 A | 7/1956 | Hodges | |
| 2,806,737 A | 9/1957 | Maxwell | |
| 2,834,606 A | 5/1958 | Bertrand | |
| 2,854,281 A * | 9/1958 | Cassin | 280/753 |
| 3,037,809 A * | 6/1962 | Praha | 280/749 |
| 3,642,303 A | 2/1972 | Irish et al. | |
| 3,664,682 A | 5/1972 | Wycech | |
| 3,795,412 A | 3/1974 | John | |
| 4,169,613 A | 10/1979 | Barnett | |
| 5,232,244 A * | 8/1993 | Itoh | 280/749 |
| 5,470,103 A | 11/1995 | Vaillancourt et al. | |
| 5,599,042 A * | 2/1997 | Shyr et al. | 280/730.1 |
| 5,602,734 A | 2/1997 | Kithil | |
| 5,992,877 A * | 11/1999 | Gray | 280/730.1 |
| 6,106,000 A | 8/2000 | Stewart | |
| 6,113,132 A | 9/2000 | Saslecov | |
| 6,135,497 A * | 10/2000 | Sutherland et al. | 280/749 |
| 6,224,088 B1 | 5/2001 | Lohavanijaya | |
| 6,237,943 B1 * | 5/2001 | Brown et al. | 280/730.2 |
| 6,250,668 B1 | 6/2001 | Breed et al. | |
| 6,431,586 B1 | 8/2002 | Eyrainer et al. | |
| 6,431,588 B1 * | 8/2002 | Bayley et al. | 280/730.2 |
| 6,467,563 B1 | 10/2002 | Ryan et al. | |

(Continued)

FOREIGN PATENT DOCUMENTS

| | | |
|---|---|---|
| DE | 19643322 | 4/1997 |
| DE | 29916526 | 3/2000 |

(Continued)

*Primary Examiner*—Ruth Ilan
(74) *Attorney, Agent, or Firm*—Tarolli, Sundheim, Covell & Tummino L.L.P.

(57) ABSTRACT

Apparatus (10) for helping to protect an occupant of a vehicle (12) includes an inflatable vehicle occupant protection device (14) and an inflator (70). The protection device (14) is inflatable from a stored position along a forward edge (62) of a vehicle roof (40) to a deployed position overlying the windshield (50). The protection device (14) while in the deployed position covers the windshield (50) from an A pillar (30) on a driver side (20) of the vehicle (12) to an A pillar of a passenger side (22) of the vehicle and from an upper edge (56) of the windshield to a position near a lower edge (58) of the windshield. The protection device (14) while deployed also covers the driver and passenger side A pillars (30).

37 Claims, 11 Drawing Sheets

U.S. PATENT DOCUMENTS

| | | | |
|---|---|---|---|
| 6,474,681 B1 * | 11/2002 | Peer et al. | 280/730.2 |
| 2002/0089152 A1 * | 7/2002 | Khoudari et al. | 280/728.2 |
| 2003/0052476 A1 | 3/2003 | Rose | |

FOREIGN PATENT DOCUMENTS

| | | |
|---|---|---|
| DE | 19860827 | 7/2000 |
| DE | 19860827 A1 * | 7/2000 |
| DE | 10020353 | 3/2001 |
| DE | 10019894 A1 | 10/2001 |
| DE | 100 50 216 A1 * | 4/2002 |
| DE | 10147965 | 10/2002 |
| DE | 101 15 064 A1 * | 11/2002 |
| DE | 10115064 | 11/2002 |
| DE | 10148094 | 11/2002 |
| JP | 2002-79900 A * | 3/2002 |
| WO | WO 00/41919 A1 * | 7/2000 |

* cited by examiner

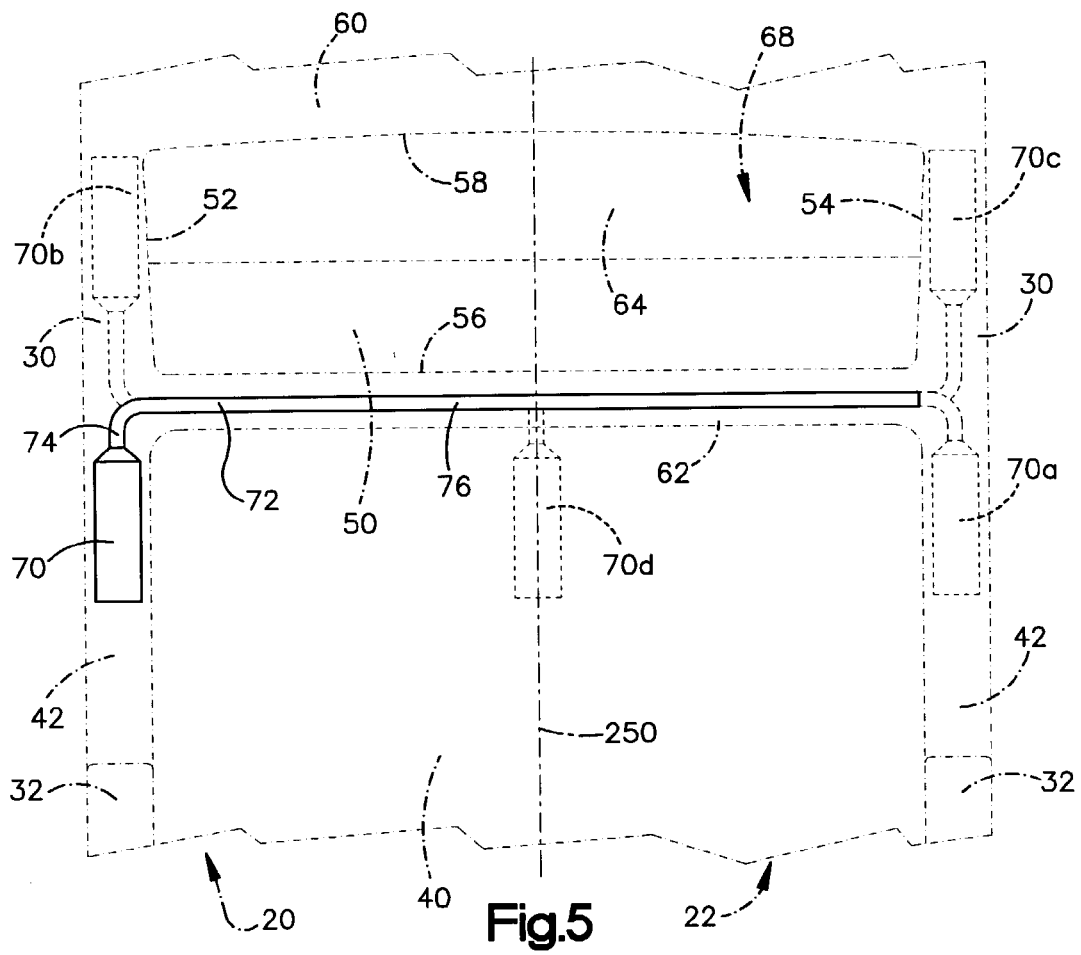

INFLATABLE WINDSHIELD CURTAIN

FIELD OF THE INVENTION

The present invention relates to an apparatus including an inflatable vehicle occupant protection device for helping to protect a vehicle occupant upon the occurrence of an event such as a vehicle collision and/or a vehicle rollover.

BACKGROUND OF THE INVENTION

It is known to inflate an inflatable vehicle occupant protection device to help protect a vehicle occupant upon the occurrence of an event such as a vehicle collision or rollover. One particular type of inflatable vehicle occupant protection device is an inflatable driver or passenger air bag that is inflatable between the occupant and an instrument panel and/or steering wheel of the vehicle. Another type of inflatable vehicle occupant protection device is an inflatable side curtain that inflates away from the roof to a position between the vehicle occupant and a side structure of the vehicle. Other known types of inflatable vehicle occupant protection devices include seat-mounted side impact air bags, inflatable knee bolsters, and inflatable seat belts. The known inflatable vehicle occupant protection devices are inflated from a deflated condition by inflation fluid provided by an inflator.

SUMMARY OF THE INVENTION

The present invention relates to an apparatus for helping to protect an occupant of a vehicle that has a roof and a windshield extending from a driver side A pillar to a passenger side A pillar of the vehicle. The apparatus comprises an inflatable vehicle occupant protection device and an inflation fluid source that is actuatable to provide inflation fluid for inflating the inflatable vehicle occupant protection device. The inflatable vehicle occupant protection device has a stored position extending along a forward edge of the vehicle roof at an upper edge of the windshield. The inflatable vehicle occupant protection device is inflatable from the stored position to a deployed position overlying the windshield. The inflatable vehicle occupant protection device, while in the deployed position, covers the windshield from the driver side A pillar to the passenger side A pillar and from an upper edge of the windshield to a position near a lower edge of the windshield. The inflatable vehicle occupant protection device, while in the deployed position, also covers the driver side A pillar and the passenger side A pillar.

The present invention also relates to an apparatus comprising an inflatable vehicle occupant protection device and an inflation fluid source that is actuatable to provide inflation fluid for inflating the inflatable vehicle occupant protection device. The apparatus also comprises first guide means for connecting the inflatable vehicle occupant protection device to the driver side A pillar and second guide means for connecting the inflatable vehicle occupant protection device to the passenger side A pillar. The inflatable vehicle occupant protection device is inflatable from the stored position to a deployed position. The first and second guide means guide the inflatable vehicle occupant protection device to deploy in a direction along the windshield. The first and second guide means help to maintain the inflatable vehicle occupant protection device positioned adjacent the windshield while inflated.

The present invention also relates to an apparatus comprising an inflatable vehicle occupant protection device and an inflation fluid source that is actuatable to provide inflation fluid for inflating the inflatable vehicle occupant protection device. The inflatable vehicle occupant protection device is inflatable from the stored position to a deployed position extending adjacent the windshield. The inflatable vehicle occupant protection device includes at least a first chamber inflatable between the windshield and an occupant of a driver side of the vehicle, at least a second chamber inflatable between the windshield and an occupant of a passenger side of the vehicle, and at least one middle chamber positioned between the first and second chambers. The first and second chambers receive inflation fluid and begin to inflate before the middle chamber.

The present invention also relates to an apparatus comprising an air bag inflatable between a vehicle occupant and an instrument panel of the vehicle. The apparatus also comprises an inflatable vehicle occupant protection device and an inflation fluid source that is actuatable to provide inflation fluid for inflating the inflatable vehicle occupant protection device. The inflatable vehicle occupant protection device is inflatable from a stored position extending along a forward edge of the vehicle roof at an upper edge of the windshield to a deployed position overlying the windshield between the windshield and the air bag. The inflatable vehicle occupant protection device while in the deployed position covers the windshield from the driver side A pillar to the passenger side A pillar and extending from the vehicle roof to adjacent the instrument panel.

The present invention also relates to an apparatus comprising an inflatable vehicle occupant protection device having an upper edge connected to the vehicle along a forward edge of the vehicle roof. A first end portion of the protection device is connected to the vehicle along the driver side A pillar. A second end portion of the protection device is connected to the vehicle along the passenger side A pillar. The protection device has a stored position extending along the forward edge and along the driver and passenger side A pillars. An inflation fluid source is actuatable to provide inflation fluid for inflating the protection device. The protection device is inflatable from the stored position to a deployed position overlying the windshield. The protection device while in the deployed position covers the windshield from the driver side A pillar to the passenger side A pillar and covers the driver side A pillar and the passenger side A pillar.

The present invention also relates to an apparatus comprising an inflatable vehicle occupant protection device having an upper edge connected to the vehicle along a forward edge of the vehicle roof. A first end portion of the protection device is connected to the vehicle along the driver side A pillar. A second end portion of the protection device is connected to the vehicle along the passenger side A pillar. The protection device, when deflated, has slack between the A pillars of the vehicle. The amount of slack between the A pillars increases as the inflatable vehicle occupant protection device extends away from the vehicle roof.

The present invention also relates to an apparatus comprising an inflatable vehicle occupant protection device having a stored position extending along a forward edge of a vehicle roof at an upper edge of a windshield of the vehicle. The protection device is inflatable from the stored position to a deployed position overlying the windshield. The protection device includes a driver side portion covering the windshield from the driver side A pillar to a centerline of the vehicle and from an upper edge of the windshield to a position terminating adjacent an upper extend of a steering wheel of the vehicle. The protection device also includes a passenger side portion covering the windshield from the passenger side A pillar to a centerline of the vehicle and from an upper edge of the windshield to a position terminating adjacent a front surface and below an upper surface of an instrument panel of the vehicle.

The present invention also relates to an apparatus comprising an inflatable windshield curtain inflatable away from a roof of the vehicle to a position overlying a vehicle windshield and extending from a driver side A pillar to a passenger side A pillar. An inflatable driver side air bag is inflatable between a vehicle occupant and a steering wheel of the vehicle. The windshield curtain and the driver side air bag while inflated combine to provide an inflated protection wall extending from the vehicle roof to a position adjacent a lower extent of the steering wheel.

The present invention further relates to an apparatus comprising an inflatable windshield curtain inflatable away from a roof of the vehicle to a position overlying a vehicle windshield and extending from a driver side A pillar to a passenger side A pillar. An inflatable passenger side air bag is inflatable between a vehicle occupant and an instrument panel of the vehicle. The windshield curtain and the passenger side air bag while inflated combine to provide an inflated protection wall extending from the vehicle roof to a position adjacent a front surface and below an upper surface of the instrument panel.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 5 is a schematic top view of the apparatus of FIGS. 2 and 3 with certain parts omitted for clarity;

FIG. 6 is a sectional view of the apparatus in the deflated and stored of FIG. 1;

DESCRIPTION OF EMBODIMENTS

In this description of embodiments of the present invention, when reference is made to a longitudinal direction in or along the vehicle 12, it is meant to describe the direction measured generally along a central axis 250 (see FIG. 5) of the vehicle. This longitudinal direction may also be described as the direction measured generally along the length of the vehicle, in the direction of straight forward vehicle travel, or horizontally as viewed in FIGS. 1–3. Also, in this description of the present invention, when reference is made to a lateral direction in or across the vehicle 12, it is meant to describe the direction measured generally perpendicular to the central axis 250 (FIG. 5). This lateral direction may also be described as the direction measured generally along the width of the vehicle, perpendicular to the direction of straight forward vehicle travel, or horizontally as viewed in FIGS. 4, 5, and 8–10.

Figure 1:
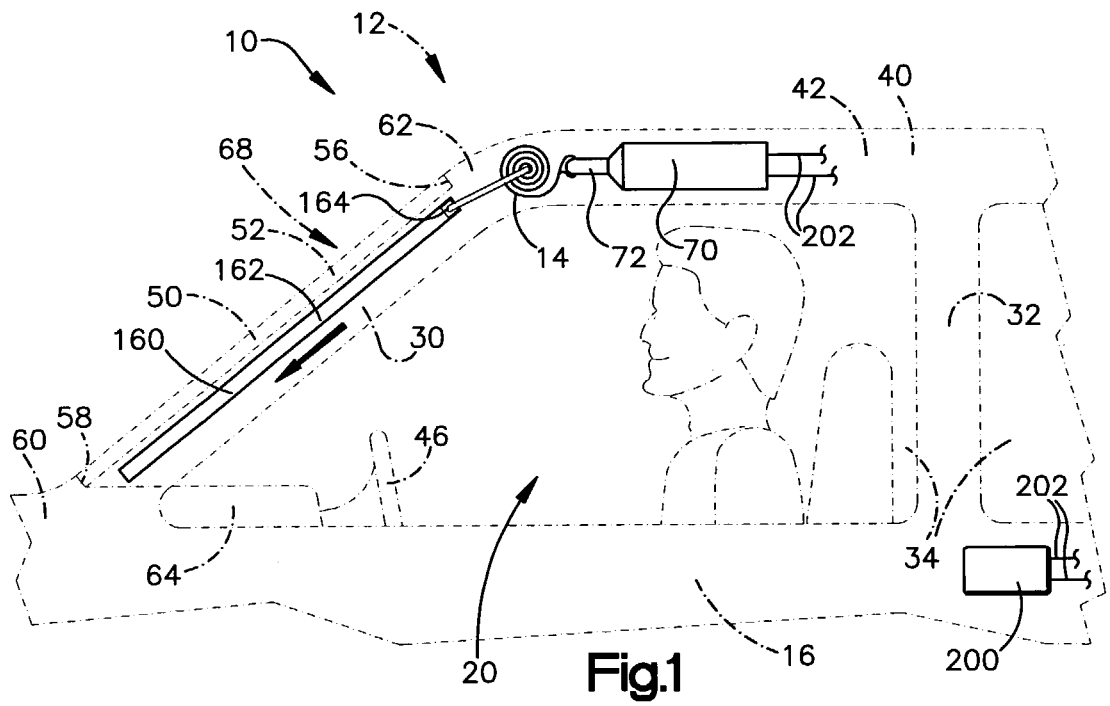
FIG. 1 is a schematic side view of an apparatus for helping to protect a vehicle occupant illustrating the apparatus in a deflated and stored condition, according to a first embodiment of the present invention.
Figure 2:
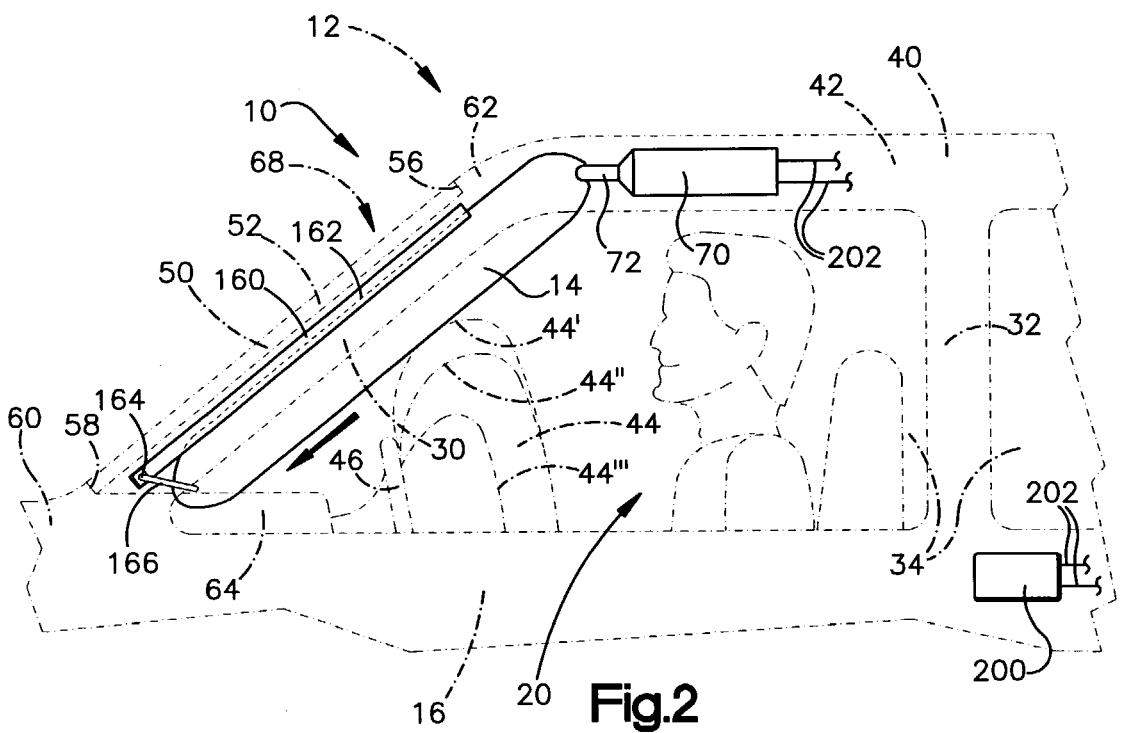
FIGS. 2 and 3 are schematic side views of the apparatus of FIG. 1 in an inflated and deployed condition.
Figure 3:
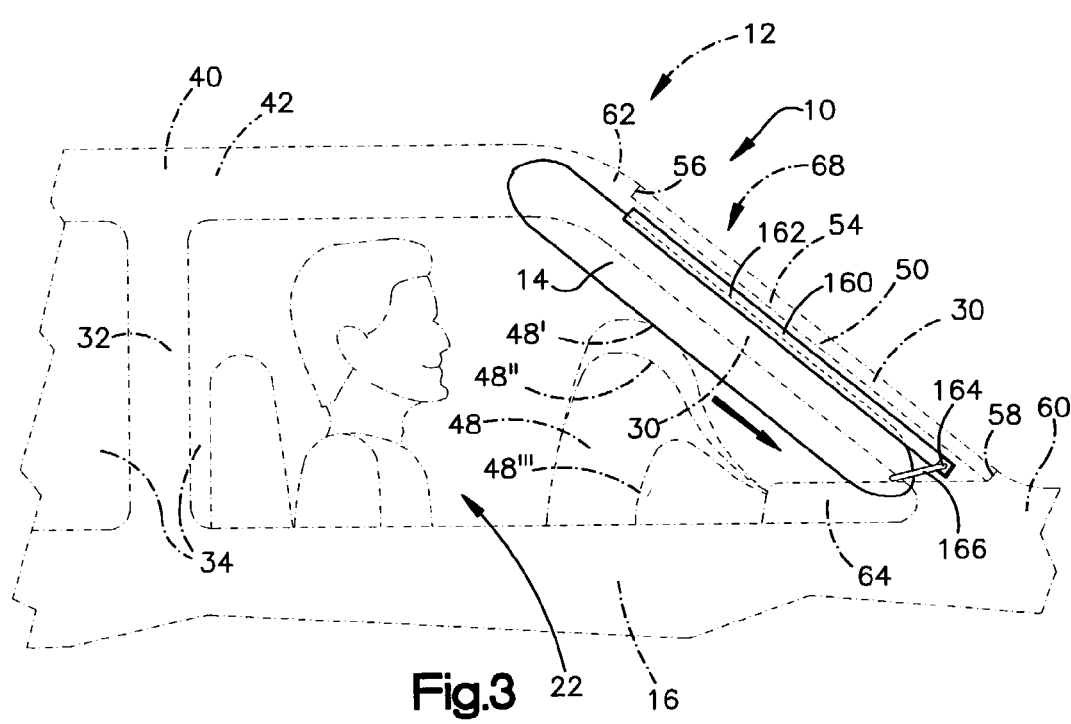
Figure 4:
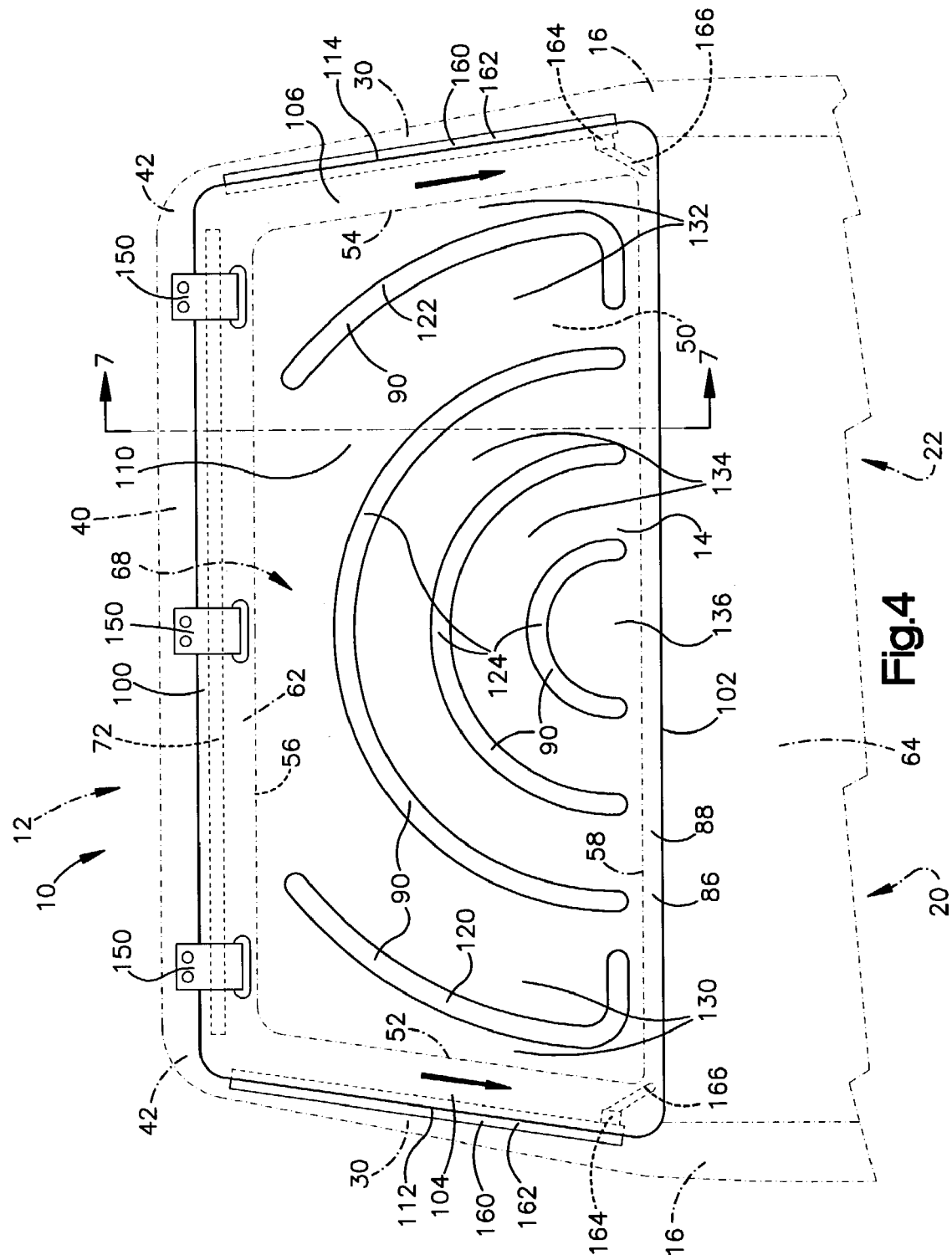
FIG. 4 is a schematic front view of a portion of the apparatus of FIGS. 2 and 3.

Referring to FIGS. 1–3, as representative of a first embodiment of the present invention, an apparatus 10 helps to protect an occupant of a vehicle 12. The vehicle 12 includes side structure 16 that extends longitudinally along the length of the vehicle. Referring to FIGS. 4 and 5, it will be appreciated that the vehicle 12 includes a side structure 16 that extends along a driver side 20 of the vehicle and a side structure that extends along a passenger side 22 of the vehicle 12. The side structures 16 on both the driver side 20 and passenger side 22 each include an A pillar 30, a B pillar 32 (see FIGS. 1–3), and side windows 34.

Referring to FIGS. 1–5, the vehicle 12 also includes a roof 40 that extends laterally across the vehicle 12 from the side structure 16 on the driver side 20 to the side structure on the passenger side 22 of the vehicle. The roof 40 also extends longitudinally along the length of the vehicle 12 from the A pillar 30 past the B pillar 32. The roof 40 includes roof rails 42 that extend along the intersection of the side structure 16 and the roof on the driver side 20 and passenger side 22 of the vehicle 12.

The vehicle 12 may also include what is referred to in the art as a front impact air bag mounted on the driver side 20 and/or passenger side 22 of the vehicle. Referring to FIG. 2, the vehicle 12 includes a driver side front impact air bag 44 mounted to a steering wheel 46 of the vehicle on the driver side 20 of the vehicle. Referring to FIG. 3, the vehicle 12 may also include a passenger side front impact air bag 48 mounted to structure of the vehicle such as an instrument panel 64 of the vehicle. The front impact air bags 44 and 48 are illustrated in FIGS. 2 and 3 in an inflated and deployed condition.

Referring to FIGS. 1–5, the vehicle 12 further includes a windshield 50. The windshield 50 extends laterally across the vehicle 12 from the A pillar 30 on the driver side 20 to the A pillar on the passenger side 22. The windshield 50 covers a windshield opening 68 of the vehicle 12. The windshield opening 68 is defined at an upper extent by the forward edge 62 of the vehicle roof 40 and at a lower extent generally by the instrument panel 64 and/or hood 60 of the vehicle 12. The windshield opening 68 is defined at lateral extents by the A pillars 30 on the driver side 20 and passenger side 22 of the vehicle 12.

The windshield 50 has a first edge portion 52 that extends along the A pillar 30 on the driver side 20 from a position adjacent or near the intersection of the A pillar and the vehicle roof 40 to a position adjacent or near the intersection of the A pillar and the instrument panel 64 and/or hood 60 of the vehicle 12. The windshield 50 also has a second edge portion 54 opposite the first edge portion 52. The second edge portion 54 extends along the A pillar 30 on the passenger side 22 from a position adjacent or near the intersection of the A pillar and the vehicle roof 40 to a position adjacent or near the intersection of the A pillar and a hood 60 of the vehicle 12.

The windshield 50 extends from the roof 40 to a position adjacent or near the instrument panel 64 and/or hood 60 of the vehicle 12. The windshield 50 has an upper edge 56 and an opposite lower edge 58 that extend laterally in the vehicle 12 between the first and second edge portions 52 and 54. The upper edge 56 extends laterally across the vehicle 12 along the forward edge 62 of the vehicle roof 40 from the A pillar on the driver side 20 to the A pillar on the passenger side 22. The lower edge 58 extends laterally across the vehicle 12 from the A pillar on the driver side 20 to the A pillar on the passenger side 22. The lower edge 58 extends adjacent or near the instrument panel 64 and/or hood 60 of the vehicle 12.

The apparatus 10 includes an inflatable vehicle occupant protection device in the form of an inflatable windshield curtain 14 that is mounted adjacent the forward edge 62 of the vehicle roof 40. An inflator 70 is connected in fluid communication with the windshield curtain 14 through a fill tube 72. The inflator 70 is actuatable to provide inflation fluid for inflating the windshield curtain 14.

The fill tube 72 has a first portion 74 (FIG. 5) for receiving fluid from the inflator 70. The fill tube 72 has a second portion 76 disposed in the windshield curtain 14. The second portion 76 of the fill tube 72 has a plurality of openings (not shown) that provide fluid communication between the fill tube 72 and the windshield curtain 14. Those skilled in the art will appreciate that the fill tube 72 could, however, be omitted, in which case the inflator 70 may be connected in fluid communication with the windshield curtain 14 directly or via a manifold (not shown).

The inflator 70 contains a stored quantity of pressurized inflation fluid (not shown) in the form of a gas for inflating the windshield curtain 14. The inflator 70 alternatively could contain a combination of pressurized inflation fluid and ignitable material for heating the inflation fluid, or could be a pyrotechnic inflator that uses the combustion of gas-generating material to generate inflation fluid. As a further alternative, the inflator 70 could be of any suitable type or construction for supplying a medium for inflating the windshield curtain 14.

The apparatus 10 has a stored condition in which the windshield curtain 14 is stored in a deflated condition. This is illustrated in FIGS. 1 and 6. When the apparatus 10 is in the stored condition, the deflated windshield curtain 14 has an elongated configuration and extends along the forward edge 62 of the vehicle roof 40 adjacent or near the upper edge 56 of the windshield 50. In the stored condition, the windshield curtain 14 extends from the A pillar 30 on the driver side 20 of the vehicle 12 to the A pillar on the passenger side 22 of the vehicle.

Referring to FIG. 6, the windshield curtain 14 is placed in the deflated and stored condition by rolling the curtain in a direction indicated by the curved arrow in FIG. 6. This is referred to herein as an "outboard roll" of the windshield curtain 14. According to this outboard roll, the windshield curtain 14 is placed in the stored condition of FIG. 5 by initially rolling the lower edge 102 of the curtain in a direction outboard of the vehicle 12 toward the windshield 50 and continuing to roll the curtain in this direction. Although the outboard roll of the illustrated embodiment is the preferred method by which to place the windshield curtain 14 in the stored condition, alternative methods, such as folding the curtain in a back-and-forth manner sometimes referred to as a "fan fold" or "Z fold," may also be used to place the curtain in the stored condition.

When the windshield curtain 14 is in the deflated and stored condition, the curtain is positioned between the vehicle roof 40 and a headliner 92 of the vehicle 12. The headliner 92 may be partially supported or covered by a vehicle trim piece 94. The trim piece 94 may, for example, extend along the intersection of the vehicle roof 40 and the windshield. The apparatus 10 may also include a housing (not shown) that houses the windshield curtain 14 in the stored condition between the roof 40 and the headliner 92.

Figure 7:
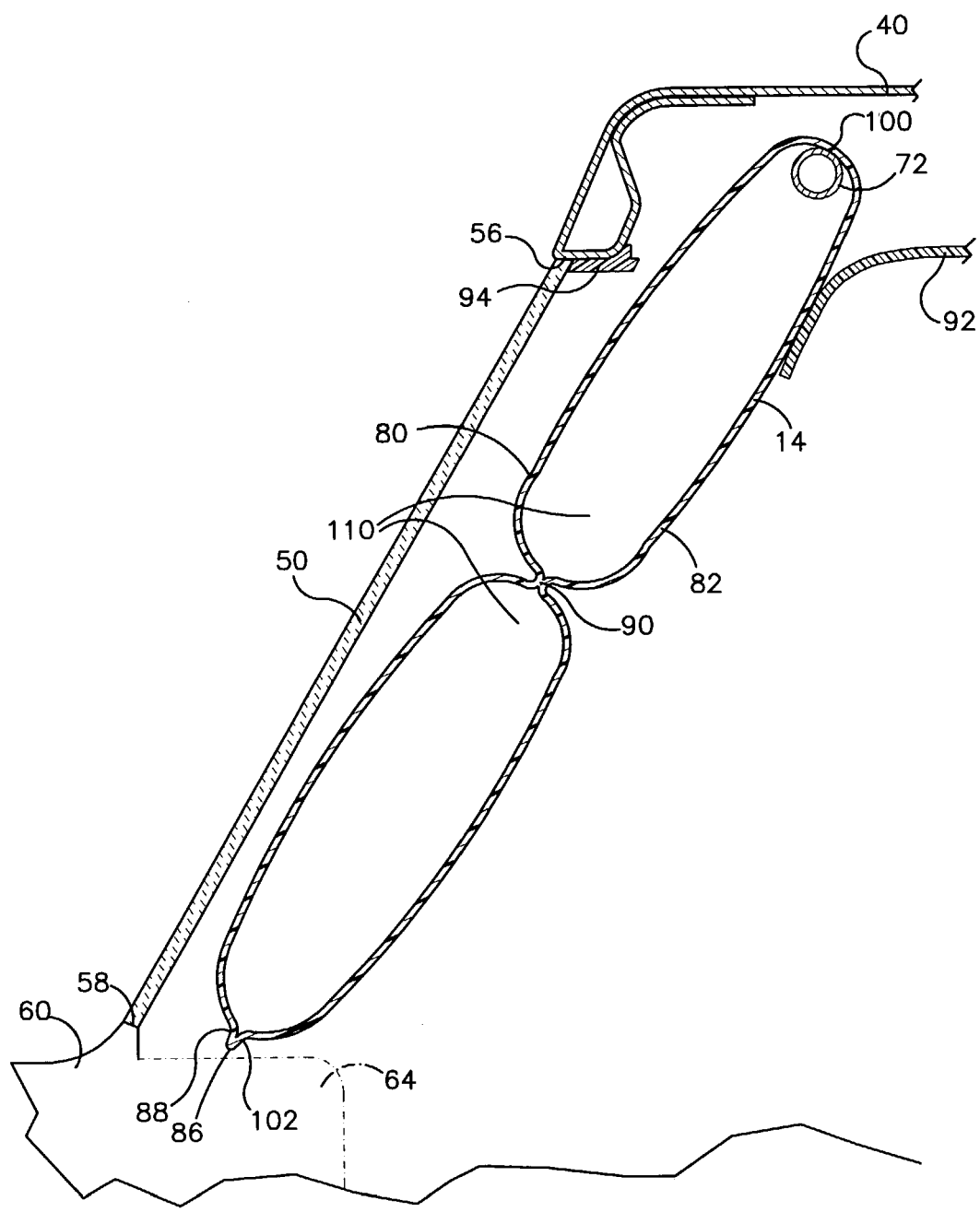
FIG. 7 is a sectional view of the apparatus taken generally along line 7—7 in FIG. 4.

Referring to FIG. 7, the windshield curtain 14 comprises first and second panels 80 and 82 that are arranged in an overlying manner. As shown in the illustrated embodiment, the first and second panels 80 and 82 may be interconnected to form a perimeter connection 86 (FIGS. 4 and 7) that extends along a perimeter 88 of the panels. The first and second panels 80 and 82 may also be interconnected to form connections 90 within the perimeter 88 of the windshield curtain 14.

According to the illustrated embodiments of the present invention, the perimeter connection 86 and the connections 90 are formed by weaving the panels 80 and 82 together. In this woven construction, the windshield curtain 14 is formed by weaving the first and second panels 80 and 82 simultaneously and interweaving the panels to form the perimeter connection 86 and the connections 90 as single layers of fabric. This can be accomplished by using, for example, a Jacquard or Dobby weaving machine. The weaving machines are pre-programmed to weave the first and second panels 80 and 82 along with the perimeter connection 86 and any connections 90 at the same time. No intermediate steps are required.

In an alternative construction of the windshield curtain 14, means such as stitching, dielectric sealing, ultrasonic bonding, heat sealing, and adhesives may be used to interconnect the first and second panels 80 and 82 in order to form the perimeter connection 86 and the connections 90. In these alternative constructions, the windshield curtain 14 may be formed by interconnecting two separate fabric pieces together along the perimeter connection 86 and the connections 90. As a further alternative, a single piece of fabric may be folded over to form the overlying first and second panels 80 and 82. In this alternative, the fold would form part of the perimeter connection 86 of the windshield curtain 14.

The windshield curtain 14 may have a variety of material constructions. For example, the windshield curtain 14 may be constructed of a woven fabric, such as nylon, that is coated with a gas impermeable material, such as urethane or silicone. The windshield curtain 14 thus may have a substantially gas-tight construction. Other materials, such as elastomers, plastic films, or combinations thereof, may also be used to construct the windshield curtain 14, in which case the curtain may have a non-woven construction. The materials used to construct the windshield curtain 14 may also be single or multi-layered materials.

The first and second panels 80 and 82, the perimeter connection 86, and the connections 90 may be coated using a laminate film, slurry, and/or a spray coating, such as silicone, urethane, or other suitable material, in order to achieve a substantially gas-tight construction. This helps to prevent gas from permeating directly through the first and second panels 80 and 82, or through the perimeter connection 86 or connections 90.

The perimeter 88 (FIG. 4) of the windshield curtain 14 is defined by upper and lower edges 100 and 102, respectively, of the curtain and first and second end portions 104 and 106, respectively, of the curtain that are spaced apart horizontally along the upper and lower edges. The perimeter connection 86 and the connections 90 help define an inflatable volume 110 of the windshield curtain 14. The first end portion 104 includes a first edge 112 of the windshield curtain 14 that extends between the upper edge 100 and the lower edge 102 of the curtain. The second end portion 106 includes a second edge 114 of the windshield curtain 14 that extends between the upper edge 100 and the lower edge 102 of the curtain.

The inflatable volume 110 of the windshield curtain 14 may have a variety of configurations defined by the shape of the perimeter connection 86 and the arrangement of the connections 90 within the perimeter connection. One such configuration is illustrated in the first embodiment of FIGS. 1–7. Those skilled in the art, however, will appreciate that the configuration of the inflatable volume 110 could vary without departing from the spirit of the present invention.

Referring to FIG. 4, in the illustrated embodiment, the connections 90 of the windshield curtain 14 include a first connection 120 near the first end portion 104 of the curtain, a second connection 122 near the second end portion 106 of the curtain, and three arc-shaped connections 124 positioned between the first and second connections. The first and second connections 120 and 122 extend in a curved manner from positions near the upper edge 100 of the windshield curtain 14, diverging away from each other as they extend downward. Respective lower end portions of the first and second connections 120 and 122 are positioned near the lower edge 102 of the windshield curtain 14 and extend toward each other in a direction generally parallel to the lower edge. The arc-shaped chambers 124 are arranged in a nested configuration facing concavely downward toward the lower edge 102 of the windshield curtain 14.

The connections 90 help define a plurality of inflatable chambers of the windshield curtain 14. A pair of driver side chambers 130 are defined by the perimeter connection 86, first connection 120, and an outermost one of the arc-shaped connections 124. A pair of passenger side chambers 132 are defined by the perimeter connection 86, second connection 122, and the outermost one of the arc-shaped connections 124. A pair of arc-shaped chambers 134 are defined by the arc-shaped connections 124. The arc-shaped chambers 134 are positioned facing concavely downward toward the lower edge 102 as viewed in FIG. 4. A lower chamber 136 is defined between the lower edge 102 of the windshield curtain 14 and the driver side chambers 130, passenger side chambers 132, and arc-shaped chambers 134. The lower chamber 136 is in fluid communication with the chambers 130, 132, and 134.

The windshield curtain 14 is adapted to receive one or more fastening devices 150 (FIG. 4), such as clamps or brackets, for helping to connect the windshield curtain to the vehicle 12. In the illustrated embodiment, the apparatus 10 includes three fastening devices 150 for connecting the windshield curtain 14 and the fill tube 72 to the vehicle roof 40.

Referring to FIGS. 1–4, the apparatus 10 also includes means for helping to guide and position the windshield curtain 14 in the vehicle 12 upon inflation and deployment of the curtain. In the embodiment illustrated in FIGS. 1–7, the means comprises a pair of slider mechanisms 160. Alternative means, such as tethers (elastic or inelastic), piston/cylinder devices, devices actuatable to cause rotation of a member such as a spool to wind up a flexible member, or any other suitable device, could also be used to help guide and position the windshield curtain.

One of the slider mechanisms 160 is positioned on the A pillar 30 on the driver side 20 of the vehicle 12. The other of the slider mechanisms 160 is positioned on the A pillar 30 on the passenger side 22 of the vehicle 12. In the illustrated embodiment, each of the slider mechanisms 160 includes a track 162 and an element or slide member 164 that is slidable along the length of the track. The tracks 162 are positioned on the A pillars 30 such that the length of each track extends along the length of its respective A pillar. The slide member 164 of each slider mechanism 160 is thus slidable along the length of its respective A pillar 30.

Each of the slider mechanisms 160 includes means (not shown), such as a ratchet or clamping mechanism, for permitting movement of the slide member 164 in a first direction along the track 162 and preventing movement of the slide member in a second direction, opposite the first direction, along the track. The first direction is generally downward along the track 162 and along the A pillar 30 from the roof 40 towards the instrument panel 64, as indicated by the arrows in FIGS. 1–4. The slide members 164 are thus slidable along their respective A pillars 30 and tracks 162 away from the vehicle roof 40 and are blocked from sliding movement in the opposite direction, i.e., towards the vehicle roof.

The windshield curtain 14 is connected to the slide members 164 of each of the slider mechanisms 160. In the embodiment illustrated in FIGS. 1–7, the curtain 14 is connected to each slide member 164 via a tether 166. The windshield curtain 14 could, however, be connected to the slide members 164 via alternative means. For example, the tethers 166 could be omitted and the curtain 14 could be connected directly to the slide members 164.

In the embodiment of FIGS. 1–7, the inflator 70 is positioned adjacent the roof rail 42 on the driver side 20 of the vehicle 12. The fill tube 72 thus extends from the inflator 70 along a portion of the roof rail 42 and into the windshield curtain 14 along the intersection of the forward edge 62 of the vehicle roof and the upper edge 56 of the windshield 50. It will be appreciated, however, that the inflator 70 may have alternative positions in the vehicle 12.

By way of example, referring to FIG. 5, the inflator 70 may be positioned adjacent the roof rail 42 on the passenger side 22 of the vehicle 12. This is illustrated at 70*a*. As another example, the inflator could be positioned in or on the A pillar 30 on the driver side 20 or passenger side 22 of the vehicle 12, as indicated at 70*b* and 70*c*, respectively, in FIG. 5. As a further example, the inflator could be positioned centrally on the roof 40, as indicated at 70*d*, in which case the inflator may have a T-shaped connection with the fill tube 72. This central location may also be advantageous in a configuration of the apparatus in which the fill tube 72 is omitted and the inflator 70 is connected to the windshield curtain 14 directly or via a manifold. Yet another example (not shown) is to position the inflator 70 within the instrument panel 64 of the vehicle 12.

The vehicle 12 includes a sensor mechanism 200 (shown schematically in FIGS. 1 and 2) for sensing an event for which inflation of the windshield curtain 14 is desired, such as a vehicle collision and/or a vehicle rollover. Upon sensing the occurrence of the event for which inflation of the windshield curtain 14 is desired, the sensor mechanism 200 provides an electrical signal over lead wires 202 to the inflator 70. The electrical signal causes the inflator 70 to be actuated in a known manner. The inflator 70 discharges fluid under pressure into the fill tube 72. The fill tube 72 directs the fluid into the inflatable volume 110 of the windshield curtain 14.

The windshield curtain 14 inflates under the pressure of the inflation fluid from the inflator 70. The windshield curtain 14 inflates away from the roof 40 and along the windshield 50 in a generally downward direction as indicated generally by the arrows in FIGS. 1–4 into the position illustrated in FIGS. 2–4 and 7.

The windshield curtain 14, when inflated, extends laterally across the vehicle from the A pillar 30 on the driver side 20 to the A pillar on the passenger side 22. When the windshield curtain 14 is in the inflated condition, the first panel 80 (FIG. 7) is positioned adjacent the windshield 50 of the vehicle 12. The upper edge 100 (FIGS. 4 and 7) of the windshield curtain 14 is positioned adjacent the forward edge 62 of the roof 40 and the upper edge 56 of the windshield 50. The lower edge 102 is positioned adjacent the instrument panel 64 and the lower edge 58 of the windshield 50. The first end portion 104 of the curtain 14 is positioned adjacent the A pillar 30 on the driver side 20 and the second end portion 106 is positioned adjacent the A pillar on the passenger side 22.

The windshield curtain 14 extends between the A pillar 30 on the driver side 20 and the A pillar 26 on the passenger side 22 and covers the windshield 50 and the windshield opening 68 of the vehicle 12. The windshield curtain 14, when in the inflated and deployed position, is positioned adjacent and overlying the windshield 50. It will be appreciated that the windshield 50 may have a planar configuration, a curved or contoured configuration, or a combination thereof. Thus, by "positioned adjacent," it is meant that the windshield curtain 14, when inflated and deployed, may follow the general planar and/or contoured configuration of the windshield 50.

Those skilled in the art will appreciate that small portions of the windshield and/or windshield opening may be left uncovered by the windshield curtain 14 when in the inflated and deployed condition. Such uncovered portions may be positioned along the edges and in the corners of the windshield 50. According to the present invention, however, the windshield curtain 14, while in the inflated and deployed condition of FIGS. 2–4 and 7, covers a substantial portion of the windshield 50. By "covering a substantial portion of the windshield," it is meant that the windshield curtain 14 covers the entire windshield 50, with perhaps the exception of portions of the windshield positioned along the edges and/or in the corners of the windshield.

The windshield curtain 14, when in the inflated and deployed condition, also covers the A pillars 30 of the vehicle 12. More specifically, the first end portion 104 covers the A pillar 30 on the driver side 20 of the vehicle 12 and the second end portion 106 covers the A pillar on the passenger side 22 of the vehicle. By "covering the A pillars," it is meant that the windshield curtain 14, when in the inflated and deployed position, is positioned between the A pillars and the vehicle occupants and covers those portions of the A pillars presented toward the occupants. In other words, the windshield curtain 14, when in the inflated and deployed condition, covers portions of the A pillars 30 that an occupant may contact from within the passenger compartment of the vehicle 12.

The windshield curtain 14, when inflated, helps to protect a vehicle occupant upon the occurrence of an event for which occupant protection is desired (e.g., vehicle collision or rollover). The connections 90 help to limit the thickness of the inflated windshield curtain 14 and help to reduce the overall volume of the curtain. The inflatable chambers 130, 132, 134, and 136, while inflated, help absorb the energy of impacts with the windshield curtain 14 and help distribute the impact energy over a large area of the curtain.

Referring to FIG. 4, as the windshield curtain 14 is inflated, inflation fluid is directed from the fill tube 72 into the inflatable volume 110 of the curtain. The inflation fluid is directed from the fill tube 70 into the driver side chambers 130 and passenger side chambers 132 of the curtain 14. The inflation fluid inflates the chambers 130 and 132 and passes through the chambers into the bottom chamber 136 and then into the middle chambers 134. The inflation fluid inflates and pressurizes the chambers 130, 132, 134, and 136.

As the windshield curtain 14 is inflated and moves from the deflated and stored condition (FIGS. 1 and 6) to the inflated and deployed condition (FIGS. 2–4 and 7), the curtain pulls on the slide members 164 via the tethers 166. This causes the slide members 164 to slide in the first direction downward along their respective track 162 and A pillar 30. During inflation and deployment of the windshield curtain 14, the slider mechanisms 160 help guide the curtain to the position illustrated in FIGS. 2–4 and 7. The slider mechanisms 160 also help maintain the windshield curtain 14 in the inflated and deployed position covering the windshield 50, windshield opening 68, and A pillars 30 throughout the duration of the event for which the curtain was deployed.

As best viewed in FIGS. 2 and 6, the A pillars 30 and the windshield 50 extend at acute angles relative to the vehicle roof 40. During inflation of the windshield curtain 14, the slider mechanisms 160 help guide the curtain along the windshield 50 to the deployed position extending adjacent and overlying the windshield and the A pillars 30. This helps ensure that the windshield curtain 14, while in the deployed position, covers the windshield 50, the windshield opening 68 and the A pillars 30.

The slider mechanisms 160, along with the outboard roll (see FIGS. 1 and 6) of the windshield curtain 14, also helps ensure that the windshield curtain 14 inflates between the windshield 50 and any front impact air bags of the vehicle 12. The guide mechanisms 160 help guide the windshield curtain 14 along the windshield 50 as the curtain is inflated and deployed. As the windshield curtain 14 inflates and deploys, the curtain unrolls toward the windshield 50, which further helps to maintain the curtain positioned adjacent and along the windshield during inflation and deployment.

Deployment of the windshield curtain 14 along the windshield 50 helps prevent interference between the windshield curtain and front impact air bags of the vehicle 12. For example, as shown in FIG. 2, the windshield curtain 14 inflates between the windshield 50 and the driver side front impact air bag 44 of the vehicle 12. As shown in FIG. 3, the windshield curtain 14 also inflates between the windshield 50 and the passenger side front impact air bag 48 of the vehicle 12. The guiding function of the slider mechanisms 160 and the outboard roll of the windshield curtain 14 thus helps to prevent the windshield curtain from deploying between the front impact air bags 44 and 48 and occupants of the vehicle 12.

Also, advantageously, the windshield curtain 14 inflates in a direction generally downward and forward in the vehicle 12 to the inflated condition. This direction is generally away from the vehicle occupant. Thus, according to the first embodiment of the present invention, the configuration of the windshield curtain 14 may help prevent the curtain from inflating toward or into the occupant.

The windshield curtain 14, when inflated, is positioned between the windshield 50 and the front impact air bags 44 and 48. As illustrated in FIG. 2, the driver side front impact air bag 44, when inflated, may touch the windshield curtain 14 (indicated at 44') or may be spaced from the windshield curtain (indicated at 44"). Similarly, as illustrated in FIG. 3, the passenger side front impact air bag 48, when inflated, may touch the windshield curtain 14 (indicated at 48') or may be spaced from the windshield curtain (indicated at 48"). Factors such as the configuration of the vehicle 12 and the seated position of vehicle occupants may help determine whether the front impact air bags 44 and 48, when inflated, touch the windshield curtain 14.

The windshield curtain 14, being positioned between the windshield 50 and the front impact air bags 44 and 48, thus may supplement the function of the front impact air bags. Impacts with the front impact air bags 44 and 48 may move the front impact air bags against the windshield curtain 14. As a result, the windshield curtain 14 may help absorb impact forces with the front impact air bags 44 and 48. The windshield curtain 14, being tensioned between the A pillars 30, may also help provide a reaction surface for the front impact air bags 44 and 48 and/or a vehicle occupant. This may especially be the case in the event that the windshield 50 is broken.

Also, since the windshield curtain 14 may assist in helping to absorb impact forces with the front impact air bags 44 and 48, it will be appreciated that the inflation characteristics (e.g., pressure, temperature, and flow rate) of the front impact air bags may be varied. For example, it is known to use a multi-stage or variable output inflator to inflate a known driver side or passenger side air bag. In this configuration, the output of the inflator is varied or tailored in accordance with sensed occupant conditions to control the rate and/or timing at which the air bag is inflated. These sensed occupant conditions are determined using a variety of known sensors. These sensors sense conditions such as vehicle seat position, occupant position, occupant weight, and seat belt latch condition.

Advantageously, the present invention may help eliminate the need to vary or tailor the output of the inflator, and thus eliminate the need to provide sensors for sensing the above mentioned conditions. Referring to FIGS. 2 and 3, the presence of the windshield curtain 14 may supplement the performance of the driver side air bag 44 and passenger side air bag 48. As a result, the size of the driver and passenger side air bags 44 and 48 may be significantly reduced. This is illustrated by the driver and passenger side air bags illustrated at 44''' and 48''' in FIGS. 2 and 3, respectively.

The driver and passenger side air bags 44''' and 48''', being significantly smaller than the known air bags, may thus be inflated at a constant or fixed rate that is less than the rate at which larger air bags, such as those illustrated at 44', 44", 48', and 48", are inflated. The air bags 44''' and 48''' would thus require the use only of a single stage inflator, without the above mentioned occupant condition sensors. In fact, it will be appreciated that the passenger side air bag 48 could even be eliminated, depending on the configuration and extent of the windshield curtain 14, as will be discussed in further detail below.

The windshield curtain 14, in combination with the front impact air bags 44 and 48, may also help provide a large area of inflated vehicle occupant protection coverage. On the driver side 20 of the vehicle 12, the windshield curtain 14 and the front impact air bag 44 combine to form an inflated wall that provides vehicle occupant protection from the roof 40 down to and covering the steering wheel 46. On the passenger side 22 of the vehicle 12, the windshield curtain 14 and the front impact air bag 48 combine to form an inflated wall that provides vehicle occupant protection from the roof 40 down to and covering the instrument panel 64.

As the windshield curtain 14 is inflated, the chambers 130, 132, 134, and 136 contract in a direction generally perpendicular to their respective lengths. In the illustrated embodiment, the driver side chambers 130 and the passenger side chambers 132 have lengths that extend in a generally vertical direction as viewed in FIG. 4. The arc shaped chambers 134 have end portions that have lengths extending in a generally vertical direction as viewed in FIG. 4. The driver side chambers 130, passenger side chambers 132, and end portions of the arc shaped chambers 134, when inflated, thus contract in a direction generally perpendicular to these generally vertical directions. As a result, the windshield curtain 14, when inflated, contracts in a generally horizontal direction as viewed in FIG. 4. This helps tension the windshield curtain 14 laterally across the vehicle 12 between the A pillars 30. The tensioning of the windshield curtain 14 may help to improve energy absorption during impacts with the curtain.

In the illustrated embodiment, the configuration of the connections 90 helps provide an advantageous inflatable chamber configuration of the windshield curtain 14. In the illustrated embodiment, upon actuation of the inflator 70, inflation fluid is directed initially into the driver side chambers 130 and passenger side chambers 132 of the windshield curtain 14. The inflation fluid inflates the driver and passenger side chambers 130 and 132 and then enters the arc-shaped chambers 134 via the lower chamber 136. This helps ensure that the driver side chambers 130 and passenger side chambers 132 begin inflating before the middle chambers 134. The portions of the windshield curtain 14 positioned between the windshield 50 and the occupants of the driver side 20 and passenger side 22 are thus inflated before the other portions (i.e., middle chambers 134) of the curtain.

Figure 8:
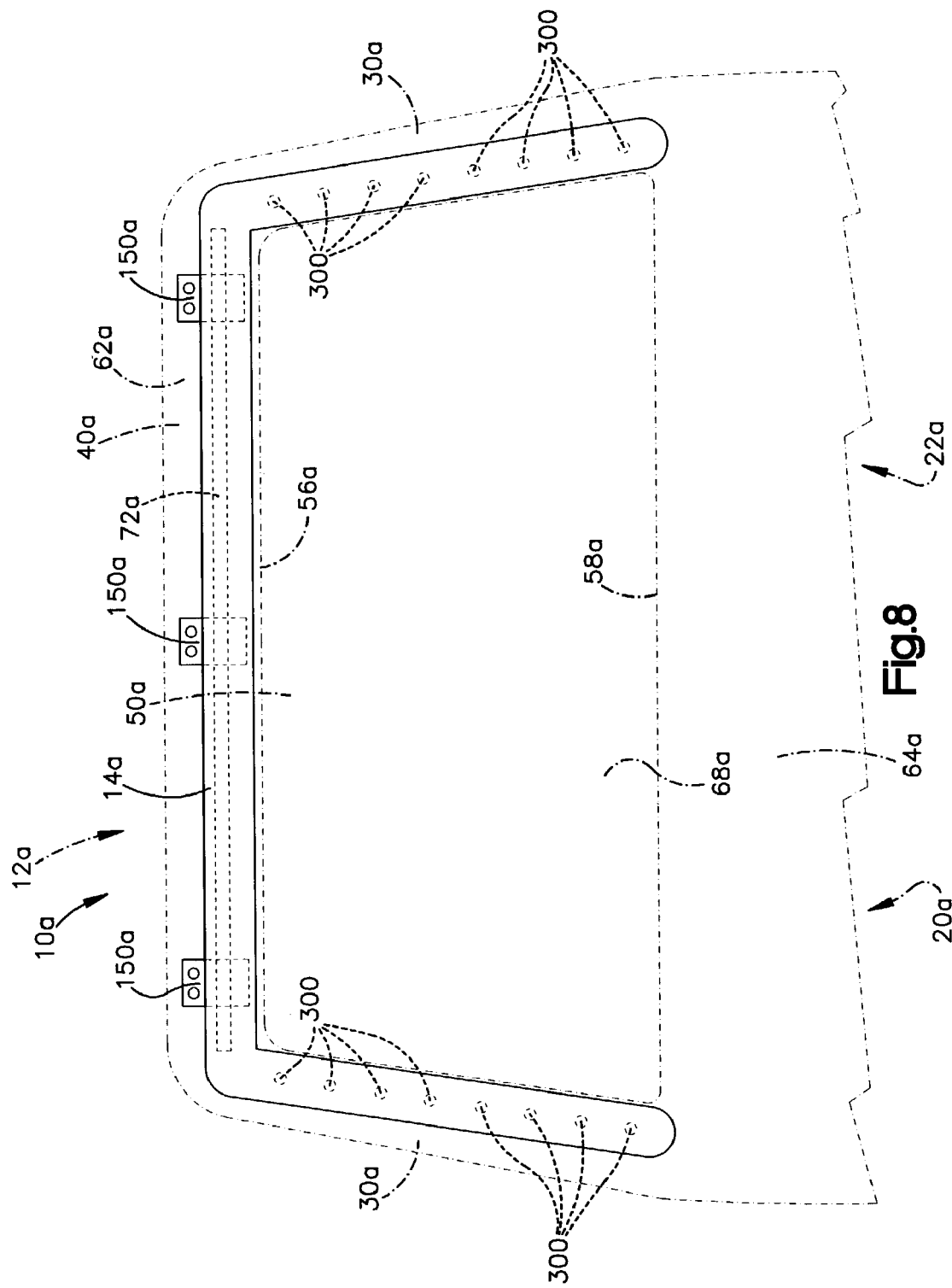
FIG. 8 is a schematic view of an apparatus for helping to protect a vehicle occupant illustrating the apparatus in a deflated and stored condition, according to a second embodiment of the present invention.
Figure 9:
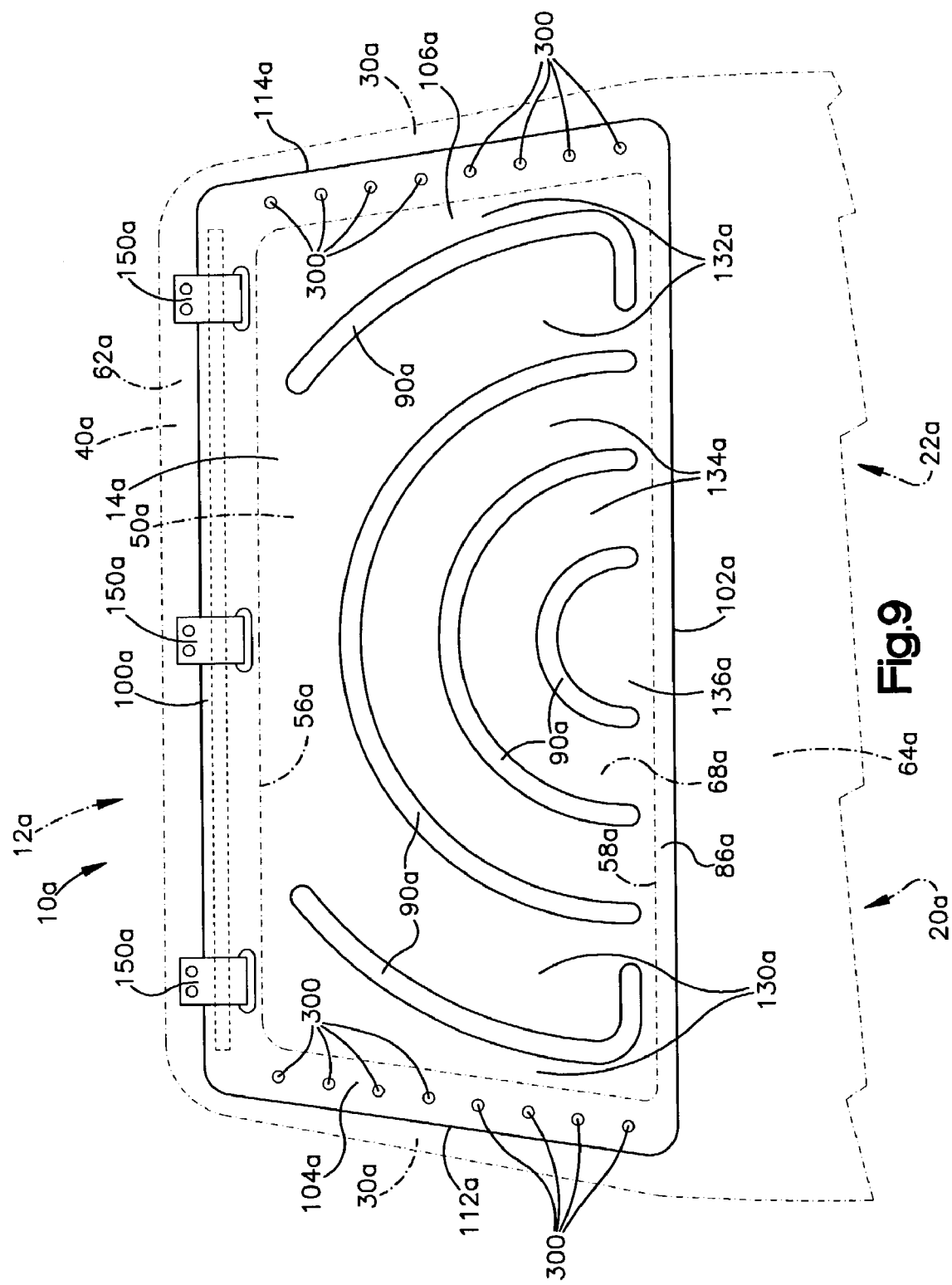
FIG. 9 is a schematic view of the apparatus of FIG. 8 in an inflated and deployed condition.
Figure 10:
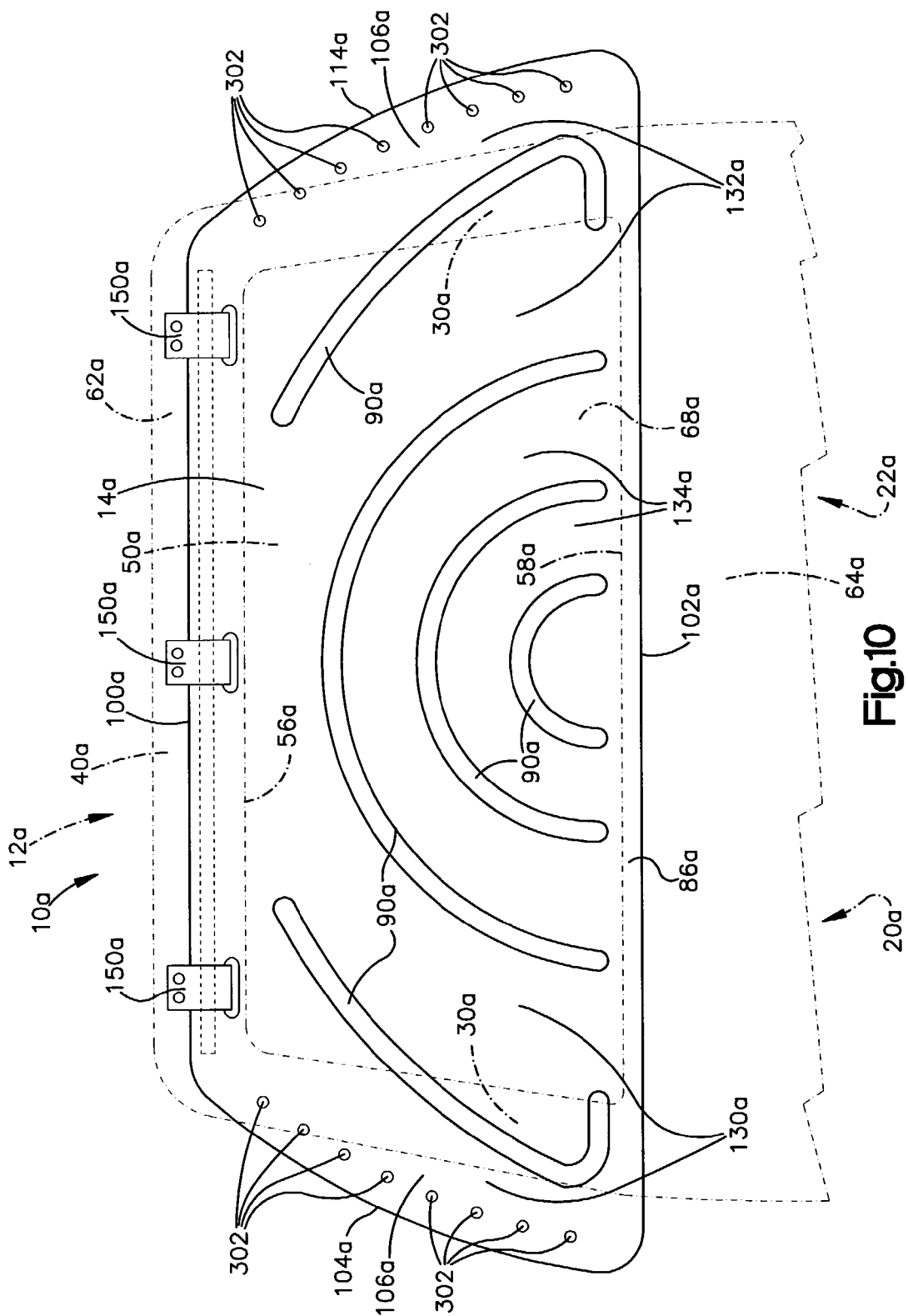
FIG. 10 is a schematic view of the apparatus of FIGS. 8 and 9 illustrating the apparatus in a non-inflated, flat condition.

A second embodiment of the present invention is illustrated in FIGS. 8–10. The second embodiment of the invention is similar to the first embodiment of the invention illustrated in FIGS. 1–7. Accordingly, numerals similar to those of FIGS. 1–7 will be utilized in FIGS. 8–10 to identify similar components, the suffix letter "a" being associated with the numerals of FIGS. 8–10 to avoid confusion. The second embodiment of the present invention is similar to the first embodiment (FIGS. 1–7), except that the windshield curtain of the second embodiment is connected to the vehicle along the driver side and passenger side A pillars.

Referring to FIGS. 8–10, in the second embodiment of the present invention, the windshield curtain 14a is connected to the vehicle 12a along the upper edge 100a and along the first and second edges 112a and 114a of the curtain. The windshield curtain 14a is connected to the vehicle 12a along the upper edge 100a (FIG. 8) of the curtain by the brackets 150a. The first and second end portions 104a and 106a of the windshield curtain 14a are connected to the A pillars 30a on the driver side 20a and passenger side 22a of the vehicle 12a, respectively, by fastening means 300.

The fastening means 300 may comprise any means suited to connect the windshield curtain 14a to the vehicle 12a along the A pillars 30a. For example, the fastening means 300 may comprise bolts or screws that extend through the perimeter connection 86a of the windshield curtain 14a to connect the curtain to the vehicle 12a. In this instance, the windshield curtain 14a would include apertures, illustrated at 302 in FIG. 10, through which the bolts or screws extend to connect the curtain to the A pillars 30a.

The fastening means 300 are positioned adjacent or near the first and second edges 112a and 114a of the windshield curtain 14a. The fastening means 300 are spaced along the first and second end portions 104a and 106a and thus connect the windshield curtain 14a to the vehicle 12a along the A pillars 30a from a position near the upper edge 56a of the windshield 50a to a position near the lower edge 58a of the windshield. The windshield curtain 14a is thus connected to the vehicle 12a along the A pillar 30a on the driver side 20a, across the forward edge 62a of the vehicle roof 40a, and along the A pillar on the passenger side 22a. The connection of the windshield curtain 14a to the A pillars 30a extends from a position adjacent or near the upper edge 10a of the curtain to a position adjacent or near the lower edge 102a of the curtain.

According to the second embodiment of the present invention, the windshield curtain 14a is configured so as to allow the curtain to be placed in the stored condition of FIG. 8 while connected along the A pillars 30a and the roof 40a. The windshield curtain 14a is also configured such that the curtain, when inflated, is tensioned between the A pillars 30a.

Referring to FIG. 10, the windshield curtain 14, when in a non-inflated and "flattened out" condition, extends laterally beyond the A pillars 30a on the driver side 20a and passenger side 22a. More specifically, the first end portion 104a extends laterally beyond the A pillar 30a on the driver side 20a while, simultaneously, the second end portion 106a extends laterally beyond the A pillar on the passenger side 22a.

In the non-inflated and flattened out condition, the first edge 112a extends downward and away from the driver side A pillar 30a at an acute angle, as viewed in FIG. 10. The second edge 114a extends downward and away from the passenger side A pillar 30a at an acute angle, as viewed in FIG. 10. Thus, as the first and second edges 112a and 114a extend away from the vehicle roof 40a, the first end second edges extend farther beyond, i.e., diverge from, the driver side and passenger side A pillars 30a, respectively.

Because the windshield curtain 14a extends beyond the A pillars 30a in the flattened condition, it will be appreciated that the curtain, when connected to the A pillars, will exhibit some looseness or slack when in a non-inflated condition. Because the first and second edges 112a and 114a extend downward and away from the A pillars 30a at acute angles, the windshield curtain 14a exhibits an increasing degree of looseness or slack as the curtain extends away from the vehicle roof 40a. Advantageously, this helps allow the windshield curtain 14a to be placed in the stored condition (FIG. 8) while remaining connected to the vehicle 12a along the A pillars 30a and the vehicle roof 40a.

The windshield curtain 14a may be placed in the stored condition of FIG. 8 by either rolling (inboard or outboard) or folding (Z fold or fan fold) the curtain. The looseness or slack in the windshield curtain 14a is taken up while placing the curtain in the stored position. Portions of the windshield curtain 14a positioned away from the vehicle roof 40a and the A pillars 30a (i.e., portions positioned more centrally and closer to the lower edge 102a) are moved a greater distance when placing the windshield curtain 14a in the stored condition than portions positioned near the roof and/or A pillars. The windshield curtain 14a, having more looseness or slack near the lower edge 102a thus allows the curtain to be placed in the stored condition while remaining connected to the vehicle 12a along the roof 40a and the A pillars 30a.

Upon sensing the occurrence of the event for which inflation of the windshield curtain 14a is desired, the inflator (not shown) is actuated in a known manner and discharges fluid under pressure into the fill tube 72a. The fill tube 72a directs the fluid into the windshield curtain 14a. The windshield curtain 14a inflates under the pressure of the inflation fluid from the inflator. The windshield curtain 14a inflates away from the roof 40a in a generally diagonal direction downward and forward in the vehicle 12a along the windshield 50a to the position illustrated in FIG. 9.

As the windshield curtain 14a (FIG. 9) is inflated, the chambers 130a, 132a, and 134a contract in a direction generally perpendicular to the length of the chambers. The driver and passenger side chambers 130a and 132a extend in a generally vertical direction and the arc shaped chambers 134a have end portions that extend in a generally vertical direction. The chambers 130a, 132a, and 134a, contract in a generally horizontal direction as viewed in FIG. 9, thus causing the windshield curtain 14a to contract in the same direction. This helps take up the looseness or slack in the windshield curtain 14a and helps tension the curtain laterally across the vehicle 12a between the A pillars 30a. This tensioning of the windshield curtain 14a may help to improve energy absorption during impacts with the curtain.

Since the windshield curtain 14a, when in a non-inflated condition, exhibits a greater or increasing degree of looseness or slack as the curtain extends away from the vehicle roof 40a, it may be desirable for the curtain to contract to a greater extent towards the lower edge 102a of the curtain when inflated in order to take up the looseness or slack. According to the present invention, the connections 90a provide an inflatable chamber configuration of the windshield curtain 14a that helps achieve this goal.

As illustrated in FIGS. 9 and 10, portions of the chambers 130a, 132a, and 134a positioned near the lower edge 102a have a more vertical orientation than portions of the chambers positioned away from the lower edge. Since the chambers 130a, 132a, and 134a contract in a direction generally perpendicular to their lengths when inflated, the portions of the chambers near the lower edge 102a contract in a direction generally laterally in the vehicle along the width of the curtain. As the chambers 130a, 132a, and 134a extend away from the lower edge 102a, the curved configuration of the chambers causes the contraction of the chambers to occur in directions transverse to the lateral direction in the vehicle. As a result, contraction of the chambers 130a, 132a, and 134a causes the degree of contraction of the windshield curtain 14a in the lateral direction to increase as the curtain extends away from the roof 40a toward the lower edge 102a. The degree of contraction of the windshield curtain 14a between the A pillars 30a is thus the greatest near the lower edge 102a of the curtain. This increasing degree of contraction helps take up the increasing degree of looseness or slack in the windshield curtain 14a.

The windshield curtain 14a, when inflated, extends laterally across the vehicle from the A pillar 30a on the driver side 20a to the A pillar on the passenger side 22a. When the windshield curtain 14a is in the inflated condition, the upper edge 10a is positioned adjacent the forward edge 62a of the roof 40a and the upper edge 56a of the windshield 50a. The lower edge 102a is positioned adjacent the instrument panel 64a and the lower edge 58a of the windshield 50a. The first end portion 104a of the curtain 14a is positioned adjacent the A pillar 30a on the driver side 20a and the second end portion 106a is positioned adjacent the A pillar on the passenger side 22a.

Because the windshield curtain 14a is connected to the vehicle along the A pillars 30a, the curtain inflates along the windshield 50a between the windshield and any front impact air bags of the vehicle 12a. Deployment of the windshield curtain 14a along the windshield 50a helps prevent interference between the windshield curtain and front impact air bags of the vehicle 12a. The windshield curtain 14a, when inflated, is positioned between the windshield 50a and any front impact air bags. The front impact air bags may touch the windshield curtain 14a or may be spaced from the windshield curtain. Factors such as the configuration of the vehicle 12a and the seated position of vehicle occupants may help determine whether the front impact air bags, when inflated, touch the windshield curtain 14a.

The windshield curtain 14a, being positioned between the windshield 50a and the front impact air bags, thus may supplement the function of the front impact air bags. Impacts with the front impact air bags may move the front impact air bags against the windshield curtain 14a. As a result, the windshield curtain 14a may help absorb impact forces with the front impact air bags. The windshield curtain 14a, being tensioned between the A pillars 30a, may also help provide a reaction surface for the front impact air bags and/or a vehicle occupant.

Also, since the windshield curtain 14a may assist in helping to absorb impact forces with the front impact air bags, the size of the driver and passenger side air bags may be significantly reduced, which may eliminate the need for occupant condition sensors and multi-stage or variable output inflators, as described above in regard to the first embodiment.

The windshield curtain 14a extends between the A pillar 30a on the driver side 20a and the A pillar 26a on the passenger side 22a and covers the windshield 50a and the windshield opening 68a of the vehicle 12a. The windshield curtain 14a, when in the inflated and deployed position, is positioned adjacent and overlying the windshield 50a and may follow the general planar and/or contoured configuration of the windshield 50a.

The windshield curtain 14a, while in the inflated and deployed condition of FIG. 9, covers a substantial portion of the windshield 50a. The windshield curtain 14a, when in the inflated and deployed condition, also covers the A pillars 30a of the vehicle 12a. More specifically, the first end portion 104a covers the A pillar 30a on the driver side 20a of the vehicle 12a and the second end portion 106a covers the A pillar on the passenger side 22a of the vehicle. The windshield curtain 14a, when in the inflated and deployed condition, covers portions of the A pillars 30a that an occupant may contact from within the passenger compartment of the vehicle 12a.

The windshield curtain 14a, in combination with the front impact air bags (not shown), may also help provide a large area of inflated vehicle occupant protection coverage in a manner similar to that illustrated in FIGS. 1–7. On the driver side 20a of the vehicle 12a, the windshield curtain 14a and the front impact air bag combine to form an inflated wall that provides vehicle occupant protection from the roof 40a down to and covering the steering wheel (not shown). On the passenger side 22a of the vehicle 12a, the windshield curtain 14a and the front impact air bag combine to form an inflated wall that provides vehicle occupant protection from the roof 40a down to and covering the instrument panel 64a.

Advantageously, the windshield curtain 14a inflates in a direction generally downward and forward in the vehicle 12a to the inflated condition. This direction is generally away from the vehicle occupant. Thus, according to the second embodiment of the present invention, the configuration of the windshield curtain 14a may help prevent the curtain from inflating toward or into the occupant.

The windshield curtain 14a, when inflated, helps to protect a vehicle occupant upon the occurrence of an event (e.g., vehicle collision or rollover) for which occupant protection is desired. The connections 90a help to limit the thickness of the inflated windshield curtain 14a and help to reduce the overall volume of the curtain. The inflatable chambers 130a, 132a, 134a, and 136a, while inflated, help to absorb the energy of impacts with the windshield curtain 14a and help to distribute the impact energy over a large area of the curtain.

The configuration of the connections 90a also helps provide an advantageous inflatable chamber configuration of the windshield curtain 14a. In the embodiment illustrated in FIGS. 8–10, upon actuation of the inflator (not shown), inflation fluid is directed initially into the driver side chambers 130a and passenger side chambers 132a of the windshield curtain 14a. The inflation fluid inflates the driver and passenger side chambers 130a and 132a and then enters the arc-shaped chambers 134a via the lower chamber 136a. This helps ensure that the driver side chambers 130a and passenger side chambers 132a begin inflating before the middle chambers 134a. The portions of the windshield curtain 14a positioned between the windshield 50a and the occupants of the driver side 20a and passenger side 22a are thus inflated before the other portions (i.e., middle chambers 134a) of the curtain.

A third embodiment of the present invention is illustrated in FIGS. 11–14. The third embodiment of the invention is similar to the first and second embodiments of the invention illustrated in FIGS. 1–10. Accordingly, numerals similar to those of FIGS. 1–10 will be utilized in FIGS. 11–14 to identify similar components, the suffix letter "b" being associated with the numerals of FIGS. 11–14 to avoid confusion. The apparatus 10b (FIGS. 11–14) of the third embodiment of the present invention is similar to the apparatus first and second embodiments (FIGS. 1–10), except that the windshield curtain of the third embodiment has a different shape than the windshield curtain of the first and second embodiments.

Referring to FIGS. 11–14, the windshield curtain 14b of the third embodiment has a driver side portion 210 and a passenger side portion 212. The driver side portion 210 extends across the windshield 50b on the driver side 20b of the vehicle 12b. The passenger side portion 212 extends across the windshield 50b on the passenger side 22b of the vehicle 12b. The windshield curtain 14b also includes connections 90b that help define inflatable chambers of the curtain.

Figure 11:
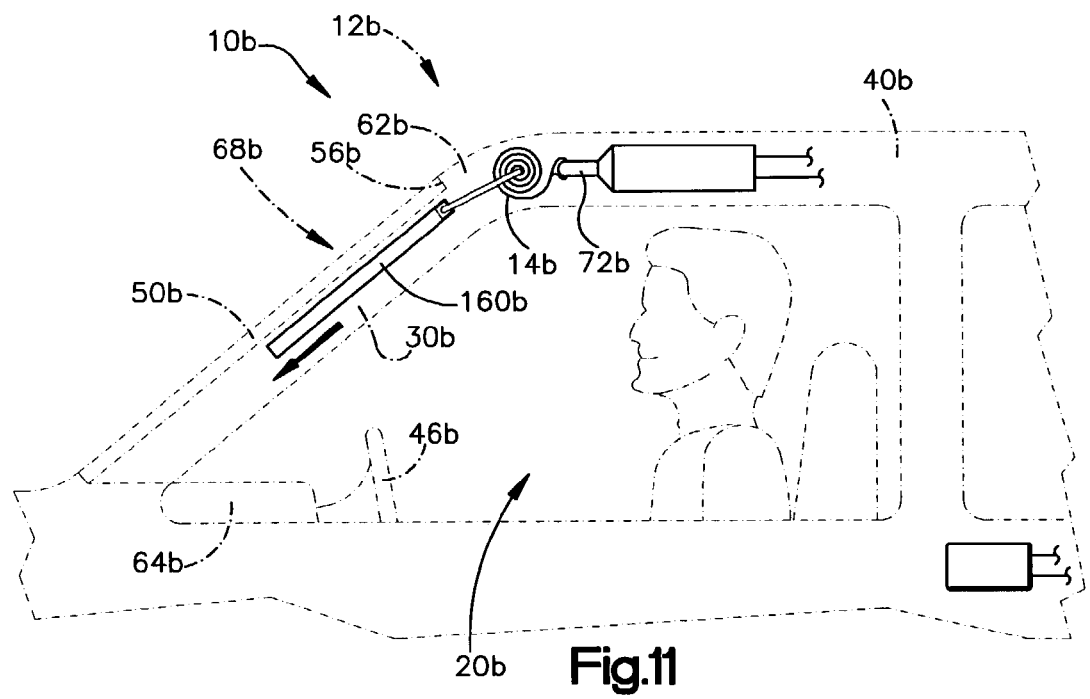
FIG. 11 is a schematic side view of an apparatus for helping to protect a vehicle occupant illustrating the apparatus in a deflated and stored condition, according to a third embodiment of the present invention.
Figure 14:
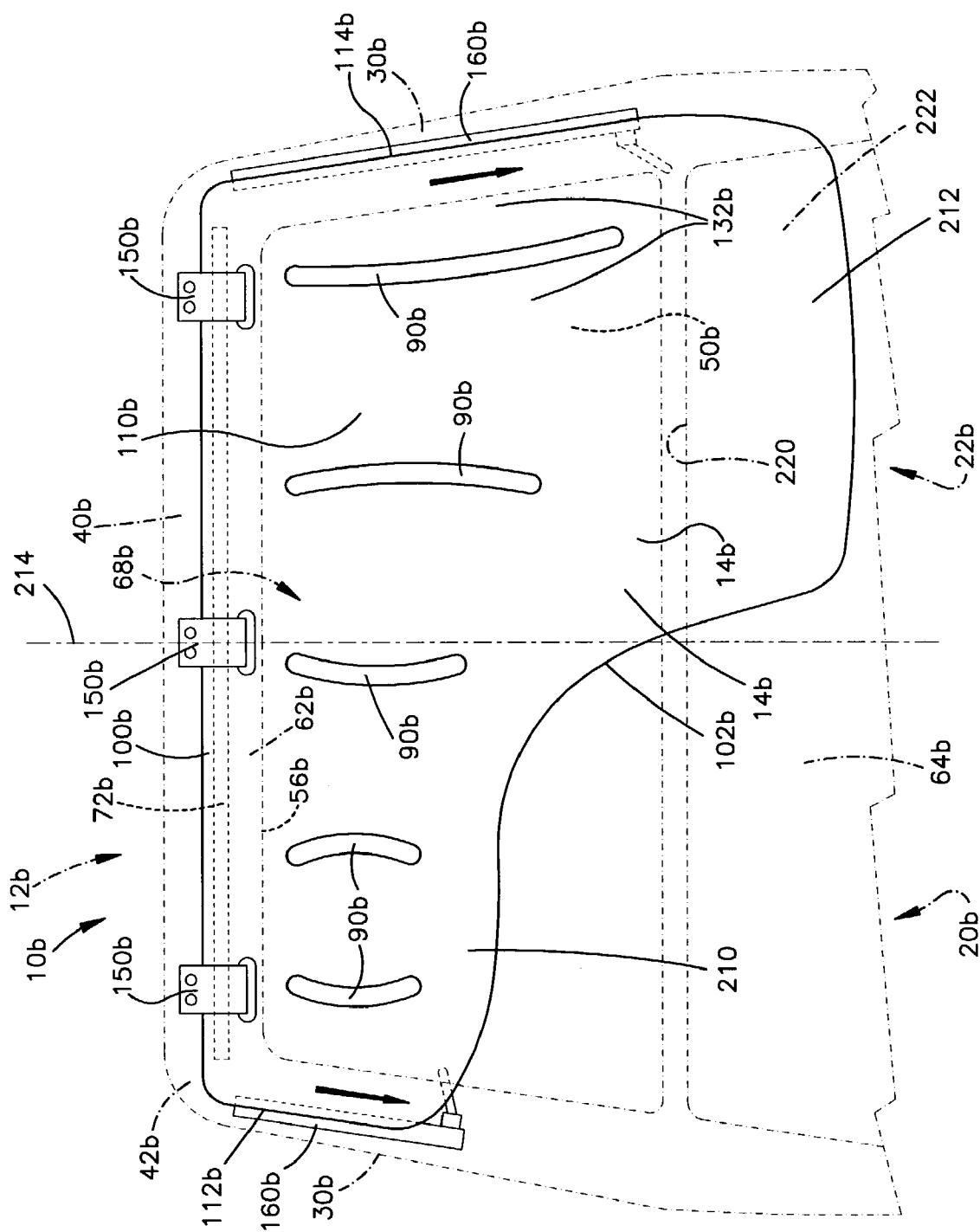
FIG. 14 is a schematic front view of a portion of the apparatus of FIGS. 12 and 13.

The windshield curtain 14b (FIG. 14) is connected to the vehicle 12b along the upper edge 100b of the vehicle via the fill tube 72b and the brackets 150b. The first and second edges 112b and 114b of the windshield curtain 14b are connected to the A pillars 30b on the driver side 20b and passenger side 22b, respectively, by slider mechanisms 160b. As shown in FIGS. 11 and 14, the slider mechanism 160b on the A pillar 30b of the driver side 20b has a shortened length to correspond with the length of the first edge 112b. The configuration and operation of the slider mechanisms 160b may be identical to that described herein above in reference to the first embodiment of FIGS. 1–7 with the exception, of course, of the length of the slider mechanism on the driver side 20b. Also, it will be appreciated that the slider mechanisms 160b could be eliminated and the windshield curtain 14b could be connected to the A pillars 30b in a manner similar or identical to that illustrated in the second embodiment of FIGS. 8–10.

Figure 12:
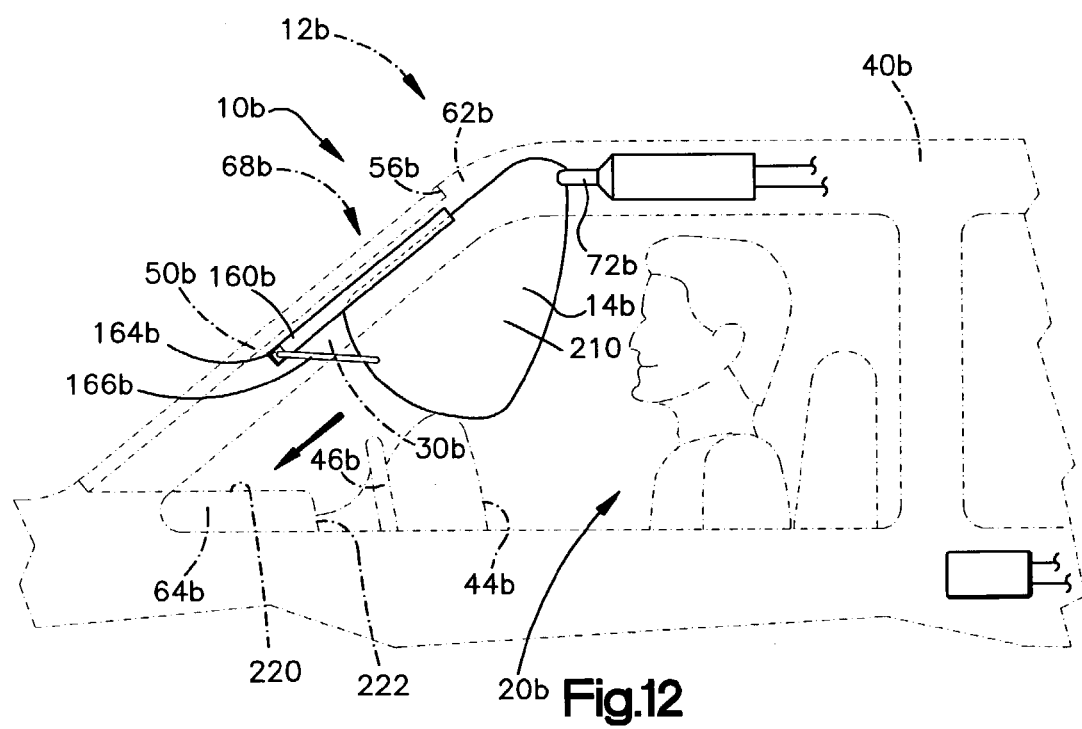
FIGS. 12 and 13 are schematic side views of the apparatus of FIG. 11 in an inflated and deployed condition.
Figure 13:
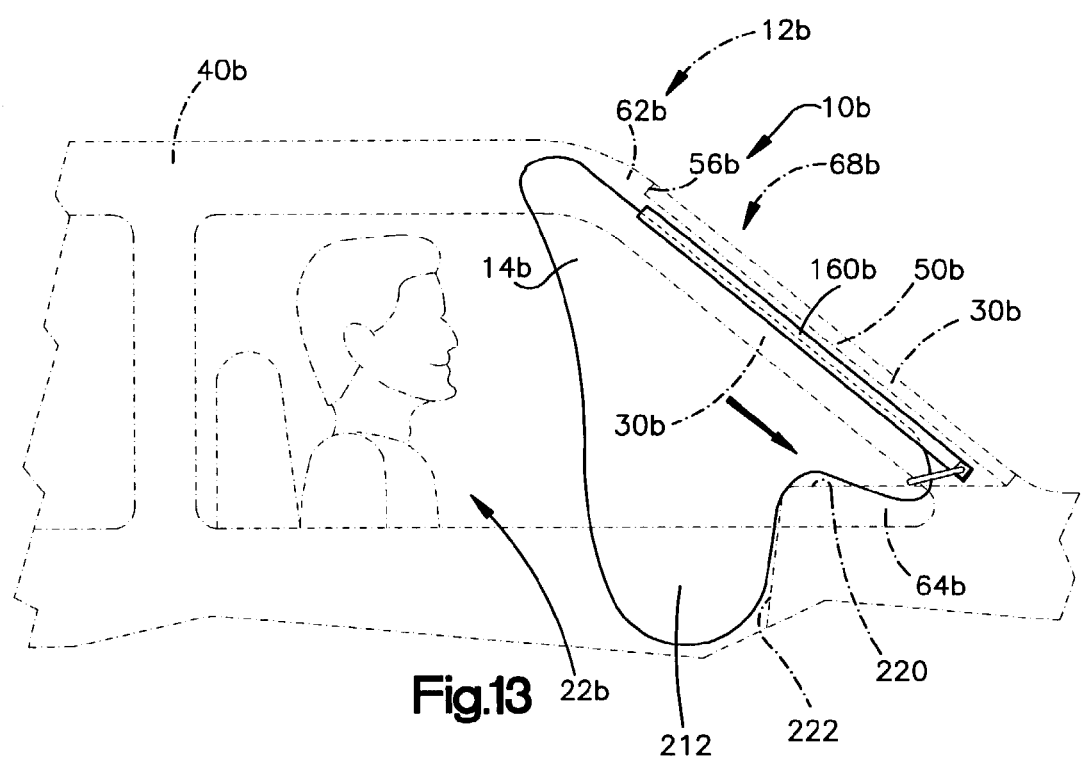

Referring to FIGS. 12–14, the windshield curtain 14b, when inflated, extends laterally across the vehicle from the A pillar 30b on the driver side 20b to the A pillar on the passenger side 22b. The first edge 112b overlies the A pillar 30b on the driver side 20b of the vehicle 12b. The second edge 114b overlies the A pillar 30b on the passenger side 22b of the vehicle 12b. The upper edge 100b is positioned adjacent the forward edge 62b of the roof 40b and the upper edge 56b of the windshield 50b.

Referring to FIGS. 12 and 14, the driver side portion 210 extends laterally in the vehicle 12b from the A pillar 30b on the driver side 20b to about a center line 214 of the vehicle. The driver side portion 210 extends vertically in the vehicle 12b from the vehicle roof 40b to a position spaced above the instrument panel 64b, in the area of an upper extent of the steering wheel 46b and driver side air bag 44b.

Referring to FIGS. 13 and 14, the passenger side portion 212 extends laterally in the vehicle 12b from the A pillar 30b on the passenger side 22b to about the center line 214 of the vehicle. The passenger side portion 212 extends vertically in the vehicle 12b from the vehicle roof 40b to a position adjacent the instrument panel 64b. The passenger side portion 212 extends below an upper surface 220 of the instrument panel 64b and adjacent a front surface 222 of the instrument panel.

As best viewed in FIG. 14, the lower edge 102b of the windshield curtain 14b includes a driver side portion 230 that extends generally laterally above the instrument panel 64b and above or adjacent the upper extent of the steering wheel 46b. The lower edge 102b also includes a passenger side portion 232 that extends generally laterally below the upper surface 220 of the instrument panel 64b. A transition portion 234 of the lower edge 102b extends diagonally between the driver and passenger side portions 230 and 232 in the area of the vehicle centerline 214.

When the windshield curtain 14b is in the inflated condition, the driver side portion 210 (see FIGS. 12 and 14) extends from the vehicle roof 40b to a position adjacent the upper portion of the steering wheel 46b. The driver side portion 210, when in the inflated condition, also extends adjacent the driver side air bag 44b. In fact, as shown in FIG. 12, the driver side portion 210, when in the inflated condition, may touch the driver side air bag.

The driver side portion 210, when inflated, is positioned between a vehicle occupant and the windshield 50b and windshield opening 68b. The driver side air bag 44b, when inflated, is positioned between the steering wheel 46b and the vehicle occupant. The driver side portion 210 and driver side air bag 44b, when inflated, combine to form an inflated wall that provides vehicle occupant protection from the vehicle roof 40b down to and covering the steering wheel 46b.

Since the driver side portion 210 extends to adjacent the driver side air bag 44b, it will be appreciated that the size of the driver side air bag may be reduced to a size sufficient to cover the steering wheel 46b. This is because the driver side portion 210 provides coverage in the area between the steering wheel 46b and the vehicle roof 40b. The driver side air bag 46b, having a reduced size, may eliminate the need for occupant condition sensors and multi-stage or variable output inflators, as described above in regard to the first embodiment.

When the windshield curtain 14b is in the inflated condition, the passenger side portion 212 (see FIGS. 13 and 14) extends from the vehicle roof 40b to a position adjacent the front surface 222 and below the upper surface 220 of the instrument panel 64b. The passenger side portion 212, when inflated, is thus positioned between a vehicle occupant and the windshield 50b and windshield opening 68b as well as the instrument panel 64b. The passenger side portion 212 provides an inflated area of protection that extends on the passenger side 22b of the vehicle 12b from the vehicle roof 40b down to adjacent the front surface 222 and below the upper surface 220 of the instrument panel 64b.

Advantageously, the driver and passenger side portions 210 and 212 of the windshield curtain 14b inflate in a direction generally downward and forward in the vehicle 12b to the inflated condition. This direction is generally away from the vehicle occupant. Thus, according to the third embodiment of the present invention, the configuration of the windshield curtain 14b may help prevent the curtain from inflating toward or into the occupant.

As shown in FIG. 13, the passenger side portion 212 of the third embodiment may eliminate altogether the need for a passenger side air bag, such as those illustrated in the first embodiment. This is because the passenger side portion 212 extends adjacent the front surface 222 and below the upper surface 220 of the instrument panel 64b. The elimination of the passenger side air bag also would eliminate the need for associated occupant condition sensors and inflators.

The windshield curtain 14b, while in the inflated and deployed condition, covers a substantial portion of the windshield 50b and the A pillars 30b of the vehicle 12b. It will be appreciated that the driver side portion 210 of the windshield curtain 14b leaves a portion of the A pillar 30b and windshield 50b on the driver side 20b of the vehicle 12b uncovered. Advantageously, however, these portions may be covered by the driver side air bag 44b. These portions also may be unlikely to be contacted by a vehicle occupant because the driver side air bag 44b helps prevent movement of the occupant toward these portions. This reduced size of the driver side portion 210 may also help reduce the volume of the windshield curtain 14b, which may help counter or offset the increased volume of the passenger side portion 212.

The windshield curtain 14b, when inflated, thus helps to protect a vehicle occupant upon the occurrence of an event (e.g., vehicle collision or rollover) for which occupant protection is desired. The connections 90b help to limit the thickness of the inflated windshield curtain 14b and help to reduce the overall volume of the curtain. The inflated chambers of the windshield curtain 14b, while inflated, help to absorb the energy of impacts with the windshield curtain and help to distribute the impact energy over a large area of the curtain.

From the above description of the invention, those skilled in the art will perceive improvements, changes and modifications. For example, the structural configuration of the vehicle (e.g., the roof, headliner, trim piece, A pillars, windshield, instrument panel, and hood) depicted in the illustrated embodiment is a simplified schematic example of a structural configuration in which the present invention may be implemented. This illustrated vehicle configuration is not meant to limit or otherwise preclude implementation of the present invention in a vehicle in which the structural configuration may differ from the structure depicted herein. Also, it will be appreciated that the configuration of the inflatable chambers of the windshield curtain may be changed and yet the operation of the curtain can be maintained such that the driver side chambers and passenger side chambers begin to inflate before middle chambers of the curtain. These and other such improvements, changes and modifications within the skill of the art are intended to be covered by the appended claims.

Having described the invention, the following is claimed:

1. Apparatus for helping to protect an occupant of a vehicle that has a roof and a windshield extending from a driver side A pillar to a passenger side A pillar of the vehicle, said apparatus comprising:

an inflatable vehicle occupant protection device having a stored position extending along a forward edge of the vehicle roof; and an inflation fluid source that is actuatable to provide inflation fluid for inflating said inflatable vehicle occupant protection device;

said inflatable vehicle occupant protection device being inflatable from said stored position to a deployed position overlying the windshield, said inflatable vehicle occupant protection device while in said deployed position having a panel extending along the windshield from the driver side A pillar to the passenger side A pillar and angularly along the windshield from an upper edge of the windshield to adjacent an intersection of an instrument panel of the vehicle and the windshield, said inflatable vehicle occupant protection device while in said deployed position also covering the driver side A pillar and the passenger side A pillar.

2. Apparatus as recited in claim 1, wherein said inflatable vehicle occupant protection device includes an upper edge, an opposite lower edge, and first and second end portions spaced from each other and extending between said upper and lower edges, said upper edge extending along the forward edge of the vehicle roof and the upper edge of the windshield while said inflatable vehicle occupant protection device is in said deployed position, said first and second end portions covering a substantial portion of the driver and passenger side A pillars, respectively, from an upper edge of the windshield to a position near a lower edge of the windshield while said inflatable vehicle occupant protection device is in said deployed position.

3. Apparatus as recited in claim 2, further comprising:

a first slider mechanism comprising a first track connected to and extending along the driver side A pillar and a first element slidable along said first track in a first direction away from the vehicle roof, said first element being blocked from sliding in a direction opposite said first direction, said inflatable vehicle occupant protection device being connected to said first element at a location on said first end portion near said lower edge of said inflatable vehicle occupant protection device; and a second slider mechanism comprising a second track connected to and extending along the passenger side A pillar and a second element slidable along said second track in a second direction away from the vehicle roof, said second element being blocked from sliding in a direction opposite said second direction, said inflatable vehicle occupant protection device being connected to said second element at a location on said second end portion near said lower edge of said inflatable vehicle occupant protection device;

said inflatable vehicle occupant protection device when deployed pulling said first and second elements and causing said first and second elements to slide along their respective first and- second tracks in said direction away from the vehicle roof, said first and second slider mechanisms guiding said inflatable vehicle occupant protection device to deploy along the windshield and helping to maintain said inflatable vehicle occupant protection device positioned adjacent the windshield while inflated.

4. Apparatus as recited in claim 1, wherein said inflatable vehicle occupant protection device when inflated covers a substantial portion of the windshield and covers substantial portions of the driver side A pillar and passenger side A pillar presented toward the occupant of the vehicle.

5. Apparatus as recited in claim 1, further comprising first guide means for connecting said inflatable vehicle occupant protection device to said driver side A pillar and second guide means for connecting said inflatable vehicle occupant protection device to said passenger side A pillar, said first and second guide means guiding said inflatable vehicle occupant protection device to deploy in a direction along the windshield and helping to maintain said inflatable vehicle occupant protection device positioned adjacent the windshield while inflated.

6. Apparatus as recited in claim 5, wherein the windshield extends from the forward edge of the vehicle roof at an acute angle relative to the roof, said first and second guide means guiding said inflatable vehicle occupant protection device to deploy from the forward edge of the roof along the windshield an angle about equal to the acute angle relative to the roof in said direction along the windshield.

7. Apparatus as recited in claim 5, wherein said first guide means comprises a first tether for connecting said inflatable vehicle occupant protection device to the driver side A pillar and said second guide means comprises a second tether for connecting said inflatable vehicle occupant protection device to the passenger side A pillar.

8. Apparatus as recited in claim 5, wherein said first guide means comprises a first slider mechanism comprising a first track connected to the driver side A pillar and a first element slidable along said first track and connected to said inflatable vehicle occupant protection device, said second guide means comprising a second slider mechanism comprising a second track connected to the passenger side A pillar and a second element slidable along said second track and connected to said inflatable vehicle occupant protection device.

9. Apparatus as recited in claim 1, wherein said inflatable vehicle occupant protection device when in said stored position is rolled up in an outboard direction toward the windshield of the vehicle.

10. Apparatus as recited in claim 9, wherein said inflatable vehicle occupant protection device while deploying unrolls in a direction toward the windshield of the vehicle.

11. Apparatus as recited in claim 1, wherein said inflatable vehicle occupant protection device includes at least a first chamber inflatable between the windshield and an occupant of a driver side of the vehicle, at least a second chamber inflatable between the windshield and an occupant of a passenger side of the vehicle, and at least one middle chamber positioned between said first chamber and said second chamber, said first chamber and said second chamber receiving inflation fluid and beginning to inflate before said middle chamber.

12. Apparatus as recited in claim 1, further comprising a driver side air bag inflatable between a vehicle occupant and a steering wheel of the vehicle, said inflatable vehicle occupant protection device being inflatable along the windshield between the windshield and said driver side air bag.

13. Apparatus as recited in claim 1, further comprising a passenger side air bag inflatable between a vehicle occupant and an instrument panel of the vehicle, said inflatable vehicle occupant protection device being inflatable along the windshield between the windshield and said passenger side air bag.

14. Apparatus as recited in claim 1, wherein said inflatable vehicle occupant protection device in combination with an inflatable driver side front impact air bag provides an inflated protection wall extending from the vehicle roof down to and covering a vehicle steering wheel when said inflatable vehicle occupant protection device and said driver side front impact air bag are inflated.

15. Apparatus as recited in claim 1, wherein said inflatable vehicle occupant protection device in combination with an inflatable passenger side front impact air bag provides an inflated protection wall extending from the vehicle roof down to and adjacent an instrument panel when said inflatable vehicle occupant protection device and said passenger side front impact air bag are inflated.

16. Apparatus as recited in claim 1, wherein said inflatable vehicle occupant protection device comprises a driver side portion extending from the driver side A pillar to a vehicle centerline and a passenger side portion extending from the passenger side A pillar to the vehicle centerline, said driver side portion extending from the vehicle roof to a position adjacent an upper portion of a vehicle steering wheel, said passenger side portion extending from the vehicle roof to a position adjacent a front surface of an instrument panel of the vehicle and vertically below an upper surface of the instrument panel.

17. Apparatus as recited in claim 16, wherein said passenger side portion has a lower extent that extends vertically below a lower extent of said driver side portion.

18. Apparatus as recited in claim 16, wherein said driver side portion in combination with an inflatable driver side front impact air bag provides an inflated protection wall extending from the vehicle roof down to and covering the vehicle steering wheel.

19. Apparatus for helping to project an occupant of a vehicle that has a roof and a windshield extending at an acute angle relative to the roof from a driver side A pillar to a passenger side A pillar of the vehicle, said apparatus comprising:
   an inflatable vehicle occupant protection device having a stored position extending along a forward edge of the vehicle roof adjacent an upper edge of the windshield;
   an inflation fluid source that is actuatable to provide inflation fluid for inflating said inflatable vehicle occupant protection device;
   first guide means for connecting said inflatable vehicle occupant protection device to the driver side A pillar; and
   second guide means for connecting said inflatable vehicle occupant protection device to the passenger side A pillar;
   said inflatable vehicle occupant protection device being inflatable from said stored position to a deployed position, said first and second guide means guiding said inflatable vehicle occupant protection device to deploy along the windshield, said first and second guide means helping to maintain said inflatable vehicle occupant protection device positioned adjacent the windshield while inflated.

20. Apparatus as recited in claim 19, wherein said first and second guide means guide said inflatable vehicle occupant protection device to deploy from the forward edge of the roof at an angle about equal to the acute angle relative to the roof in said direction along the windshield.

21. Apparatus for helping to protect an occupant of a vehicle that has a roof and a windshield, said apparatus comprising:
   an inflatable vehicle occupant protection device having a stored position extending along a forward edge of the vehicle roof at an upper edge of the windshield; and
   an inflation fluid source that is actuatable to provide inflation fluid for inflating said inflatable vehicle occupant protection device;
   said inflatable vehicle occupant protection device being inflatable from said stored position to a deployed position overlying the windshield, said inflatable vehicle occupant protection device including at least a first chamber having a side wall that extends from an upper portion of the first chamber away from the roof at an angle with a driver side A pillar between the windshield and an occupant of a driver side of the vehicle, at least a second chamber having a side wall that extends from an upper portion of the second chamber away from the roof at an angle with a passenger side A pillar between the windshield and an occupant of a passenger side of the vehicle, and at least one middle chamber positioned between said first chamber and said second chamber, said first chamber and said second chamber receiving inflation fluid and beginning to inflate before said middle chamber.

22. The apparatus recited in claim 21, further comprising a fill tube extending along the forward edge of the vehicle roof, said fill tube delivering inflation fluid from said inflation fluid source into said first and second chambers.

23. Apparatus as recited in claim 21, wherein said inflatable vehicle occupant protection device when in said stored position is rolled up in an outboard direction toward the windshield of the vehicle.

24. Apparatus for helping to protect an occupant of a vehicle that has a roof and a windshield extending from a driver side A pillar to a passenger side A pillar of the vehicle, said apparatus comprising:
   an inflatable vehicle occupant protection device having an upper edge connected to the vehicle along a forward edge of the vehicle roof, a first end portion connected to the vehicle along the driver side A pillar, and a second end portion connected to the vehicle along the passenger side A pillar, said inflatable vehicle occupant protection device having a stored position extending along the forward edge and along the driver and passenger side A pillars; and
   an inflation fluid source that is actuatable to provide inflation fluid for inflating said inflatable vehicle occupant protection device;
   said inflatable vehicle occupant protection device being inflatable from said stored position to a deployed position overlying the windshield, said inflatable vehicle occupant protection device while in said deployed position covering the windshield from the driver side A pillar to the passenger side A pillar and covering the driver side A pillar and the passenger side A pillar.

25. Apparatus as recited in claim 24, wherein said first end portion is connected to the vehicle along the driver side A pillar from a position near an upper edge of the windshield to a position near a lower edge of the windshield, and said second end portion is connected to the vehicle along the passenger side A pillar from a position near the upper edge of the windshield to a position near the lower edge of the windshield.

26. Apparatus as recited in claim 24, wherein said first end portion is connected to the driver side A pillar at a position near an upper edge of the windshield and at a position near a lower edge of the windshield, and said second end portion is connected to the passenger side A pillar at a position near the upper edge of the windshield and at a position near the lower edge of the windshield.

27. Apparatus as recited in claim 24, wherein said first end portion extends laterally beyond the driver side A pillar and said second end portion extends laterally beyond the passenger side A pillar when said inflatable vehicle occupant protection device is in a non-inflated and flattened out condition.

28. Apparatus as recited in claim 27, wherein said first end portion includes a first edge that diverges downward and away from the driver side A pillar, and said second end portion includes a second edge that diverges downward and away from the passenger side A pillar when said inflatable vehicle occupant protection device is in a non-inflated and flattened out condition.

29. Apparatus as recited in claim 24, wherein said inflatable vehicle occupant protection device comprises a plurality of inflatable chambers that when inflated contract a lateral direction in the vehicle thus tensioning said inflatable vehicle occupant protection device between the A pillars.

30. Apparatus as recited in claim 29, wherein said inflatable chambers are configured to contract laterally near a lower edge of said inflatable vehicle occupant protection device to a greater extent than portions near said upper edge of said inflatable vehicle occupant protection device.

31. Apparatus for helping to protect an occupant of a vehicle that has a roof and a windshield extending from a driver side A pillar to a passenger side A pillar of the vehicle, said apparatus comprising:
   an inflatable vehicle occupant protection device having an upper edge connected to the vehicle along a forward edge of the vehicle roof, a first end portion connected to the vehicle along the driver side A pillar, and a second end portion connected to the vehicle along the passenger side A pillar; and
   an inflation fluid source that is actuatable to provide inflation fluid for inflating said inflatable vehicle occupant protection device;
   said inflatable vehicle occupant protection device when deflated having slack between the A pillars of the vehicle, the amount of slack between the A pillars increasing as said inflatable vehicle occupant protection device extends away from the vehicle roof.

32. Apparatus as recited in claim 31, wherein the amount of slack in said inflatable vehicle occupant protection device is sufficient to permit said inflatable vehicle occupant protection device to be placed in a stored position extending along the forward edge and along the driver and passenger side A pillars.

33. Apparatus for helping to protect an occupant of a vehicle that has a roof and a windshield extending from a driver side A pillar to a passenger side A pillar of the vehicle, said apparatus comprising:
   an inflatable vehicle occupant protection device having a stored position extending along a forward edge of the vehicle roof at an upper edge of the windshield; and
   an inflation fluid source that is actuatable to provide inflation fluid for inflating said inflatable vehicle occupant protection device;
   said inflatable vehicle occupant protection device being inflatable from said stored position to a deployed position overlying the windshield, said inflatable vehicle occupant protection device including a driver side portion covering the driver side A pillar and covering the windshield from an upper edge of the windshield to a position terminating adjacent an upper extent of a steering wheel of the vehicle, said inflatable vehicle occupant protection device including a passenger side portion covering the passenger side A pillar and covering the windshield from an upper edge of the windshield to a position terminating adjacent a front surface and below an upper surface of an instrument panel of the vehicle.

34. Apparatus for helping to protect an occupant of a vehicle that has a roof and a windshield extending from a driver side A pillar to a passenger side A pillar of the vehicle, said apparatus comprising:
   an inflatable windshield curtain inflatable away from the roof to a position overlying the windshield and extending from the driver side A pillar to the passenger side A pillar and extending down to adjacent an intersection of the windshield and an instrument panel of the vehicle;
   an inflatable driver side air bag inflatable from a steering wheel of the vehicle between a vehicle occupant and the steering wheel of the vehicle; and
   at least one inflation fluid source actuatable to provide inflation fluid for inflating said windshield curtain and said driver side air bag;
   said windshield curtain and said driver side air bag while inflated combining to provide an inflated protection wall extending from the vehicle roof down to and covering the vehicle steering wheel.

35. Apparatus for helping to protect an occupant of a vehicle that has a roof and a windshield extending from a driver side A pillar to a passenger side A pillar of the vehicle, said apparatus comprising:
   an inflatable windshield curtain inflatable away from the roof to a position overlying the windshield and extending from the driver side A pillar to the passenger side A pillar and extending down to adjacent an intersection of the windshield and an instrument panel of the vehicle;
   an inflatable passenger side air bag inflatable between a vehicle occupant's head and an instrument panel of the vehicle; and
   at least one inflation fluid source actuatable to provide inflation fluid for inflating said windshield curtain and said passenger side air bag;
   said windshield curtain and said passenger side air bag while inflated combining to provide an inflated protection wall extending from the vehicle roof down to a position adjacent a front surface and below an upper surface of the instrument panel.

36. Apparatus for helping to protect an occupant of a vehicle, said apparatus comprising:
   an inflatable vehicle occupant protection device inflatable to at least partially cover a windshield of the vehicle;
   first means for connecting said inflatable vehicle occupant protection device to a driver side A pillar of the vehicle;
   said first means comprising a first track and a first element slidable along said first track in a first direction and being blocked from sliding in a direction opposite said first direction, said inflatable vehicle occupant protection device being connected to said first element;
   second means for connecting said inflatable vehicle occupant protection device to a passenger side A pillar of the vehicle;
   said second means including a second track and a second element slidable along said second track in a second direction and being blocked from sliding in a direction opposite said second direction, said inflatable vehicle occupant protection device being connected to said second element.

37. Apparatus for helping to protect an occupant of a vehicle that has a roof and a windshield, said apparatus comprising an inflatable vehicle occupant protection device inflatable away from the vehicle roof to a position between the windshield and occupants of the vehicle, said inflatable vehicle occupant protection device comprising a driver side portion and a passenger side portion, said passenger side portion extending vertically below a lower extent of said driver side portion.

* * * * *